US 11,454,791 B2
Sep. 27, 2022

(12) United States Patent
Ahluwalia et al.

(54) OPTICAL COMPONENT FOR GENERATING A PERIODIC LIGHT PATTERN

(71) Applicant: Universitetet I Tromsø-Norges Arktiske Universitet, Tromso (NO)

(72) Inventors: Balpreet Singh Ahluwalia, Tromso (NO); Thomas R. Huser, Werther (DE); Olav Gaute Hellesø, Kvaloya (NO)

(73) Assignee: Universitetet I Tromsø-Norges Arktiske Universitet, Tromso (NO)

( * ) Notice: Subject to any disclaimer, the term of this patent is extended or adjusted under 35 U.S.C. 154(b) by 535 days.

(21) Appl. No.: 16/603,105

(22) PCT Filed: Apr. 5, 2018

(86) PCT No.: PCT/GB2018/050917
§ 371 (c)(1),
(2) Date: Oct. 4, 2019

(87) PCT Pub. No.: WO2018/185489
PCT Pub. Date: Oct. 11, 2018

(65) Prior Publication Data
US 2021/0109334 A1 Apr. 15, 2021

(30) Foreign Application Priority Data

Apr. 7, 2017 (GB) ........................... 1705660
Apr. 7, 2017 (NO) ........................... 20170592

(51) Int. Cl.
*G01J 4/00* (2006.01)
*G02B 21/00* (2006.01)
(Continued)

(52) U.S. Cl.
CPC ..... *G02B 21/0032* (2013.01); *G01N 21/6458* (2013.01); *G02B 27/10* (2013.01);
(Continued)

(58) Field of Classification Search
CPC .... G02B 21/0032; G02B 27/10; G02B 27/58; G02B 27/0905; G01N 21/6458;
(Continued)

(56) References Cited

U.S. PATENT DOCUMENTS 5,666,197 A    9/1997   Guerra
6,255,642 B1   7/2001   Cragg et al.
(Continued)

FOREIGN PATENT DOCUMENTS

CN     104303089     1/2015
CN     104459971     3/2015
(Continued)

OTHER PUBLICATIONS

Ahluwalia et al. "Rib waveguides for trapping and transport of particles." Optics express 24, No. 5 (Mar. 7, 2016): 4477-4487.
(Continued)

*Primary Examiner* — Md M Rahman
(74) *Attorney, Agent, or Firm* — Diederiks & Whitelaw, PLC.

(57) ABSTRACT

An optical component for illuminating a sample region with a periodic light pattern comprises: a first waveguide, a further waveguide and an optical splitter. The optical splitter has an input for receiving light, a first output and a second output. The first waveguide is optically coupled to the first output, to direct the first input light into the sample region in a first direction. The second output is optically coupled to the sample region to direct second input light into the sample region in a second direction. The further waveguide is arranged to receive third input light which is directed into the sample region in a third direction. The first direction, second direction and third direction are different from one another. The first and second input light interferes to form a (Continued)

periodic pattern in the sample region. The optical component may be used for structured illumination microscopy.

20 Claims, 15 Drawing Sheets

(51) Int. Cl.
G01N 21/64 (2006.01)
G02B 27/10 (2006.01)
G02B 27/58 (2006.01)

(52) U.S. Cl.
CPC ......... *G02B 27/58* (2013.01); *G01N 2201/06* (2013.01); *G01N 2201/0635* (2013.01); *G01N 2201/06113* (2013.01); *G01N 2201/08* (2013.01); *G01N 2201/108* (2013.01)

(58) Field of Classification Search
CPC ..... G01N 2201/06; G01N 2201/06113; G01N 2201/0635; G01N 2201/08; G01N 2201/108
USPC ........................................................ 356/368
See application file for complete search history.

(56) References Cited

U.S. PATENT DOCUMENTS

| | | |
|---|---|---|
| 2008/0128627 A1 | 6/2008 | Lundquist et al. |
| 2009/0046298 A1 | 2/2009 | Betzig |
| 2009/0168158 A1 | 7/2009 | Schwertner et al. |
| 2009/0219607 A1 | 9/2009 | Saggau et al. |
| 2011/0036996 A1 | 2/2011 | Wolleschensky et al. |
| 2012/0069344 A1 | 3/2012 | Liu |
| 2015/0248015 A1 | 9/2015 | Schwedt et al. |

FOREIGN PATENT DOCUMENTS

| | | |
|---|---|---|
| JP | 2007-510961 | 4/2007 |
| JP | 2014137501 | 7/2014 |
| WO | 2005047944 | 5/2005 |
| WO | 2008033625 | 3/2008 |
| WO | 2010/088418 | 8/2010 |
| WO | 2017/068620 | 4/2017 |

OTHER PUBLICATIONS

Helle et al. "Optical transport, lifting and trapping of micro-particles by planar waveguides." *Optics express* 23, No. 5 (Mar. 9, 2015): 6601-6612.

Hellesø et al. "Surface transport and stable trapping of particles and cells by an optical waveguide loop." *Lab on a Chip* 12, No. 18 (Jun. 21, 2012): 3436-3440.

"High-Speed Chip-Based Nanoscopy to Discover Real-Time Sub-Cellular Dynamics." CORDIS. European Commission, n.d. http://cordis.europa.eu/project/rcn/109985_en.html. (Jun. 21, 2012).

"High-Speed Chip-Based Nanoscopy to Discover Real-Time Sub-Cellular Dynamics." University of Tromsø, The Arctic University of Norway, Aug. 22, 2013.

"Job Postdoctoral Research Fellow in Optical Nanoscopy at the Department of Physics and Technology." Accessed Jul. 7, 2016. http://no.wypr.edu/jobber-tilbry-postdoctoral-research-fellow-in-optical . . . (Apr. 30, 2016).

"Optical Nanoscopy: ERC Starting Grant." UiT, Dec. 11, 2013. https://en.uit.no/prosjekter/prosjektsub?p_document_id=349293&sub_id=353485.

Wei et al. "Plasmonic Structured Illumination Microscopy." *Nano Letters* 10, No. 7 (May 27, 2010): 2531-2536.

Wei et al. "Wide field super-resolution surface imaging through plasmonic structured illumination microscopy." *Nano letters* 14, No. 8 (Jul. 11, 2014): 4634-4639.

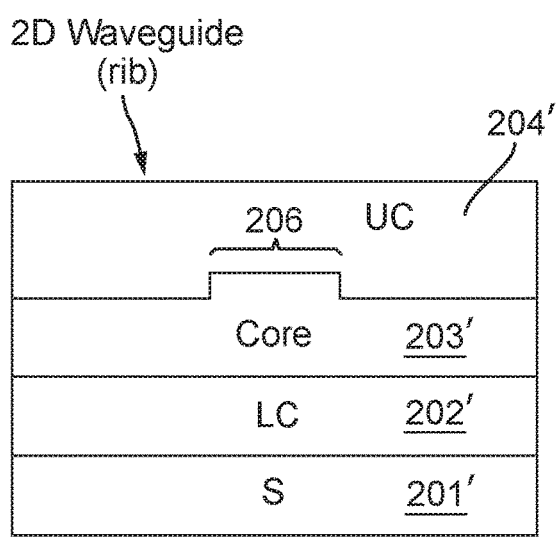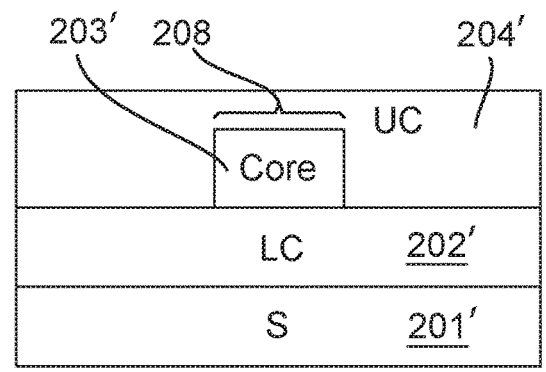

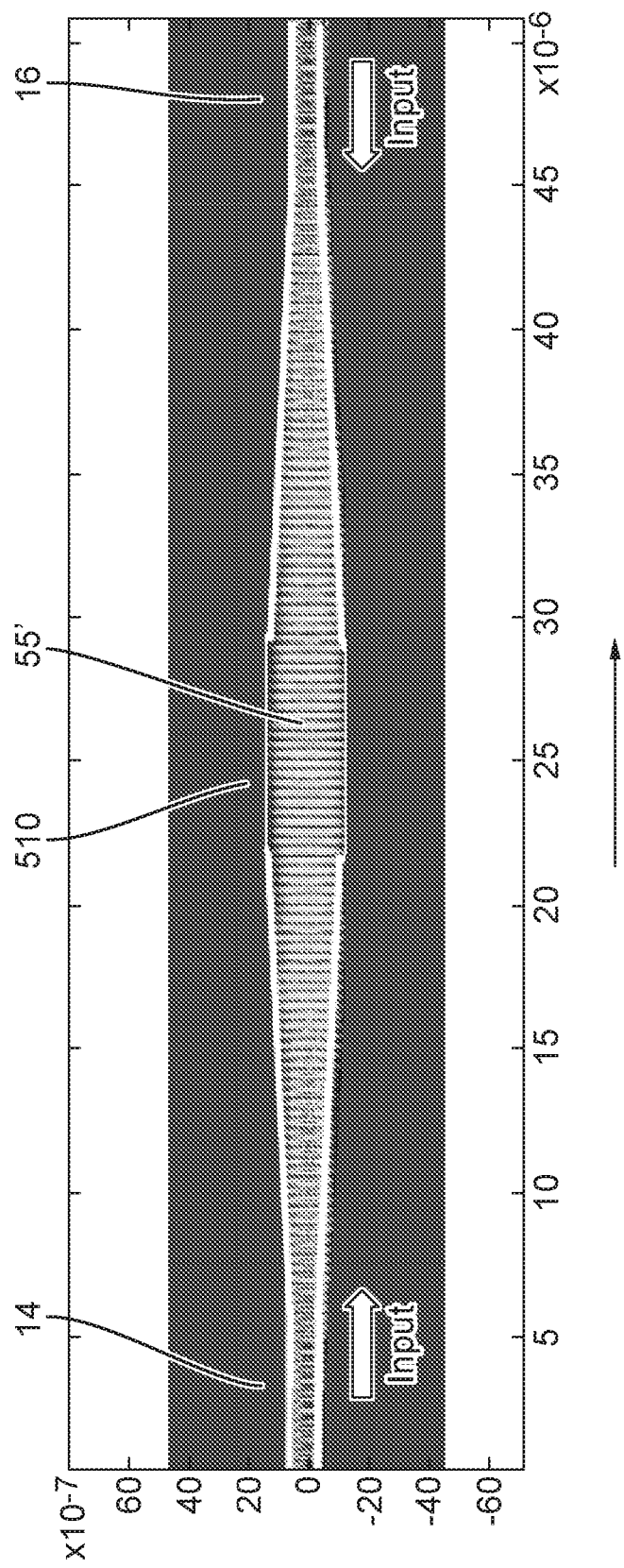

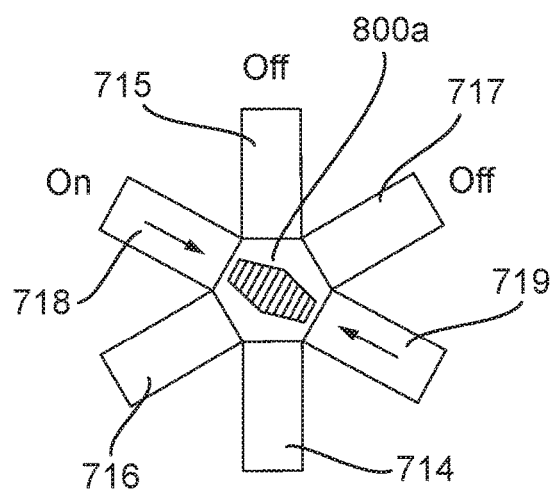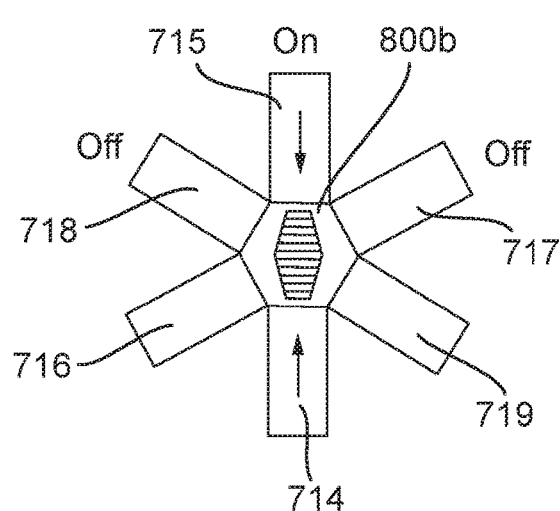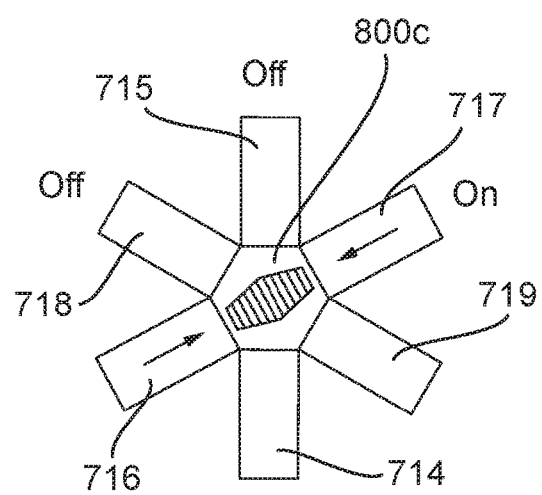

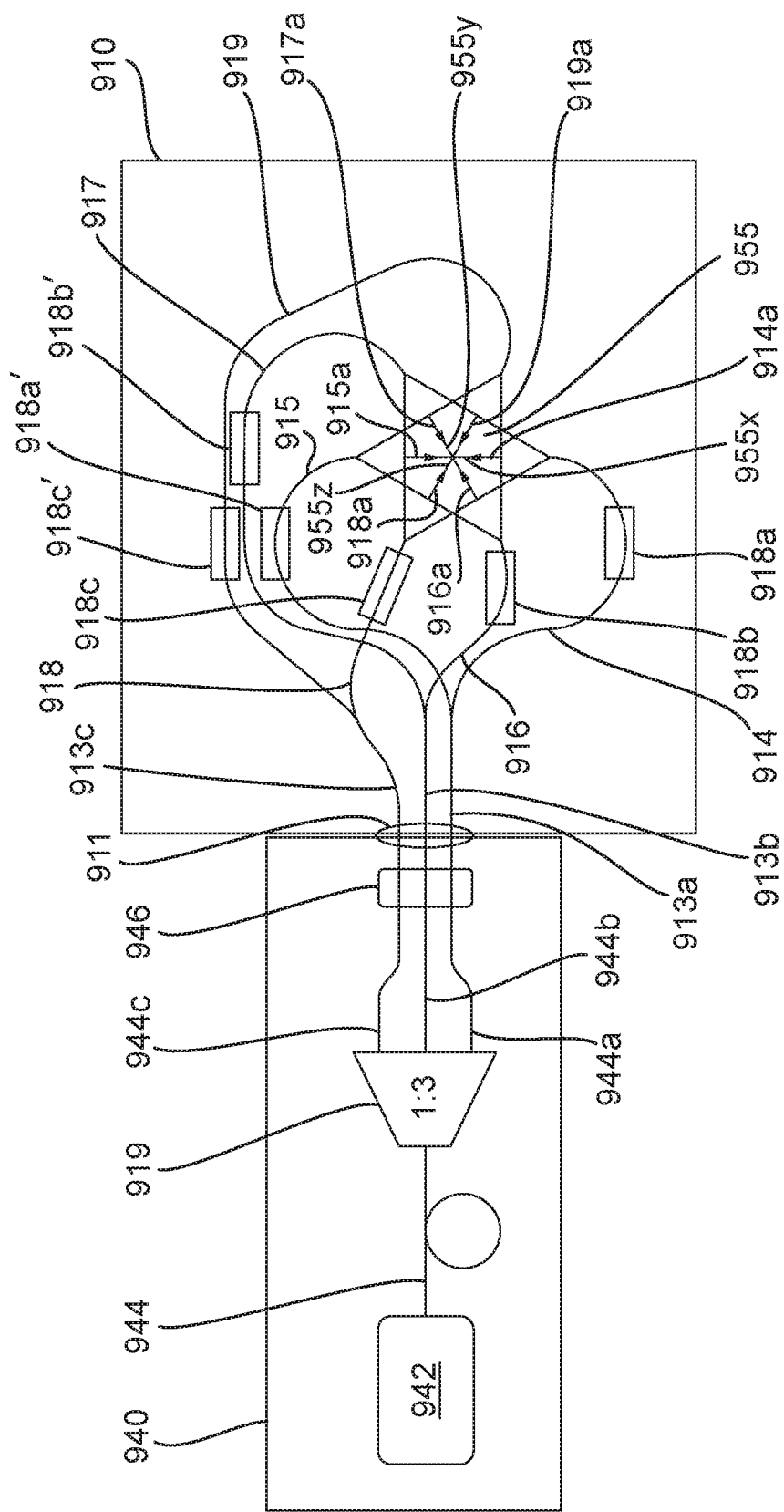

US 11,454,791 B2

OPTICAL COMPONENT FOR GENERATING A PERIODIC LIGHT PATTERN

CROSS-REFERENCE TO RELATED APPLICATIONS

This application represents the U.S. National Phase of International Application number PCT/GB2018/050917 entitled "Optical Component for Generating a Periodic Light Pattern" filed Apr. 5, 2018, which claims priority to Great Britain Application number 1705660.7 filed Apr. 7, 2017 and Norwegian Application number 20170592 filed Apr. 7, 2017, all of which are incorporated herein by reference.

FIELD

This invention relates to optical components, systems and methods for illuminating a sample with a periodic light pattern. More specifically, but not exclusively, it relates to optical components, systems and methods for imaging a sample using Structured Illumination Microscopy (SIM).

BACKGROUND

Optical microscopes are used within histology, cell biology and related fields to view biological samples such as cells. However, the resolving power of optical microscopes is limited due to the diffraction limit of light. This limitation restricts the resolution of visible light microscopy to around 200 to 300 nm. In order to overcome this limit, several techniques have been developed in the art, termed "nanoscopy", "super-resolution imaging", or "super-resolution microscopy".

These super-resolution imaging techniques allow imaging of a biological sample with a resolution finer than 200 nm, and possibly down to around 20 to 50 nm. They typically process light emitted from markers, such as photo-switchable fluorophores or quantum dots, that have been attached to, or embedded within, the biological sample. Known examples of such super-resolution techniques include ensemble techniques such as Structured Illumination Microscopy (SIM) and Stimulated Emission Depletion Microscopy (STED), and single-molecule localisation techniques such as Photo-Activated Localization Microscopy (PALM) and Stochastic Optical Reconstruction Microscopy (STORM).

Single-molecule localisation techniques typically provide better resolution (e.g. 20-50 nm) but they are generally slower than the ensemble techniques and therefore not usually suitable for imaging live cell samples.

In general, STED has a practical optical resolution of around 30 nm. However, because it is a scanning based technique (e.g. a raster scanning based technique), it also suffers from slow imaging speeds (around 0.1 Hz for a wide field of view) that are not well suited to live cell imaging. This problem is exacerbated when a wide field-of-view is needed (i.e. when a large sample area needs to be scanned). Moreover, STED techniques typically require high-power illumination to excite the light emitting markers (e.g. fluorophores) and this is problematic because it can lead to photo-bleaching effects and photo-toxicity.

In SIM based techniques, the sample is illuminated with different periodic light patterns. Typically, the periodic light pattern is a periodic striped light pattern that is generated using diffraction gratings. During the imaging processing, the fringes of the periodic light pattern are usually shifted relative to the sample and also rotated relative to the sample, over a sequence of frames, so as to generate and illuminate the sample with a plurality of different periodic light patterns. A super-resolution image of the sample can then be constructed based on Fourier analysis of the different emission patterns from the light-emitting markers that result from the different illumination patterns. These emission patterns reveal information about the structure of the sample beyond the resolution limit of the imaging system, because of the Moiré effect caused by the periodic illumination patterns.

Conventional SIM set-ups typically have an optical resolution of around 100-130 nm and acquire images faster than STED and single-molecule localisation set-ups (e.g. SIM imaging speeds of around 0.1-1 Hz are typical for a wide field of view). Furthermore, unlike scanning-based set-ups, conventional SIM based set-ups can capture a wide field image (e.g. 50-100 $\mu m^2$ or more) of the sample in a single shot. However, the improvement in imaging speed provided by conventional SIM based set-ups (albeit at lower resolution than STED) is in general still not considered to be fast enough for many practical live-cell experiments.

To increase the imaging speed of SIM set-ups it is possible to reduce the field of view over which an image is taken. Using this approach, SIM based set-ups have been reported that take images at speeds of 11 Hz over a 8 $\mu m \times 8$ $\mu m$ field of view. However, reducing the field of view is often undesirable because, if a wide-field view is required, the sample and imaging apparatus then need to be repositioned and re-aligned relative to each other in order to obtain a composite image of the whole sample. This is particularly problematic when imaging live cell samples.

Some structured-light imaging set-ups utilise opto-mechanical arrangements such as movable lenses, stages, movable gratings or mirrors to shift and/or rotate the periodic light patterns. A problem with such set-ups is that the imaging speed is limited by the speed at which these components move.

U.S. Pat. No. 6,255,642 B1 (Massachusetts Institute of Technology), for example, describes a system involving a movable mirror that is used to shift fringes relative to a sample.

In general, the optical resolution of SIM-type set-ups is limited by the fringe spacing in the periodic light pattern (e.g. the spacing between the fringes in a stripped illumination pattern). However, other factors may further limit the resolution. For example, in conventional SIM set-ups, where the illumination pattern is formed with an imaging objective lens, the optical resolution may be further limited by the diffraction limit of the objective lens. The diffraction limit of an objective lens is given as $\lambda_0/(2*N.A.)$ where $\lambda_0$ is the wavelength, and N.A. is the numerical aperture of the objective lens. The resolution enhancement factor of SIM is double for a given objective lens, i.e. $\lambda_0/(4*N.A.)$, which is typically 100-130 nm for visible wavelengths (500-650 nm). In many applications (e.g. in live cell imaging applications) it is desirable to increase the optical resolution of SIM set-ups.

The present invention aims to address at least some of these shortcomings in known approaches to generating periodic light patterns suitable for super-resolution microscopy.

SUMMARY

From a first aspect, the invention provides an optical component for illuminating a sample region with a periodic light pattern, the optical component comprising a first waveguide, a further waveguide, and an optical splitter, the optical splitter having (i) an input for receiving input light, (ii) a first output, and (iii) a second output, wherein:

the first output of the optical splitter is optically coupled to the first waveguide so as to direct first input light into the first waveguide;

the first waveguide is arranged to use total internal reflection to direct the first input light into the sample region along a first path in a first direction;

the second output of the optical splitter is optically coupled to the sample region so as to direct second input light into the sample region along a second path in a second direction;

the further waveguide is arranged to receive third input light and to use total internal reflection to direct the third input light into the sample region along a third path in a third direction;

the second direction is different from the first direction so that, in use, the first input light interferes with the second input light to form a periodic light pattern in the sample region; and the third direction is different from the first direction and from the second direction.

From a second aspect, the invention provides a method for illuminating a sample region of an optical component comprising a first waveguide, a further waveguide, and an optical splitter, the method comprising:

receiving input light at the optical splitter;

receiving first input light in the first waveguide from a first output of the optical splitter;

using total internal reflection within the first waveguide to direct the first input light into the sample region along a first path in a first direction;

directing, from a second output of the optical splitter, second input light into the sample region along a second path in a second direction, wherein the second direction is different from the first direction;

receiving third input light in the further waveguide;

using total internal reflection within the further waveguide to direct the third input light into the sample region along a third path in a third direction, wherein the third direction is different from the first and the second directions; and interfering the first input light and the second input light, or the first, second and the third input light, together to form a periodic light pattern in the sample region.

In accordance with the present invention, it will be seen by those skilled in the art that a single optical component (e.g. an optical chip) may direct three separate light beams, simultaneously or at different times, into the sample region along different directions to form various two- and three-beam interference patterns in the sample region.

It will be appreciated that directing at least two beams of light directly or obliquely towards each other within the sample region will cause the beams to interfere. This interference will generate a periodic light pattern (i.e. a periodic interference pattern) suitable for illuminating a sample within the sample region. Illuminating a sample with a periodic light pattern is useful in applications such as super resolution microscopy (e.g. SIM imaging) where, for example, the illumination pattern excites fluorescence in the sample. In some embodiments, the emitted light pattern (i.e. fluorescence pattern) from the sample may be imaged and analysed using known SIM processing methods.

By avoiding the need for multiple, separate opto-mechanical components to generate and direct light beams along different directions within the sample region, so as to interfere within the sample region, this single optical component avoids much of the alignment complexity involved in traditional SIM imaging set-ups. Further, by reducing or eliminating the use of such components, the optical component can facilitate a much smaller, cheaper and less complex set-up for SIM imaging.

The (first) optical splitter enables at least two beams of light (e.g., said first input light and the second input light) to be formed for generating a periodic light pattern from one input light beam (e.g., said input light). Any difference in path length between the two outputs of the optical splitter, to the sample region, can thereby be accurately maintained, because this is not reliant on the precise alignment of external components.

In some embodiments, this one input light beam can be received at a single face of the optical component, thereby making it relatively easy to incorporate the optical component into a complete imaging system. The third input light may also be received at the same face of the optical component.

Thus it will be appreciated that the single optical component may receive fewer than three input light beams to generate a three-beam interference pattern because the waveguide splitter advantageously splits input light to generate at least two interfering beams. For example, the waveguide splitter may be arranged to receive input light at its input and generate the first, second, and third input light. In this case, the third input light may be directed into the further waveguide from a third output of the optical splitter. This enables a three-beam interference pattern to be generated within the sample region from a single input light beam, received at the input of the optical splitter, further reducing a need for careful alignment of multiple discrete optical elements.

Optionally, the optical component may comprise an additional waveguide. For convenience, this additional waveguide will be referred to hereafter as the "second waveguide". The second output of the splitter may be arranged to direct second input light into the sample region via the second waveguide. The second waveguide may be arranged to use total internal reflection to direct second input light into the sample region along the second path in the second direction. Also for convenience, the aforementioned "further waveguide" will be referred to herein as the "third waveguide", even though it will be appreciated that there is no "second waveguide" in some embodiments—e.g., if the second output of the optical splitter is coupled directly into the sample region.

If light is directed in the first, second and third directions simultaneously, the resulting periodic interference pattern within the sample region will be the result of the first, the second, and the third light beams interfering. Generating a periodic interference pattern with at least three beams in this way may yield a pattern that has more fringes than a two beam interference pattern. Increasing the number of fringes may be useful for improving the SIM imaging quality under certain imaging conditions, such as when using speckle SIM techniques. The fringe positions may be determined in part by the angular offset between neighbouring pairs of beams. Changing the fringe positions can be useful for adjusting the SIM image quality. Notably, the fringe pattern formed by the waveguide can be made smaller than the fringe generated by the objective lens typically used in conventional SIM and in conventional speckle SIM, by fabricating the waveguides from a high refractive index material—e.g., a material that gives an effective refractive index of 2 or more.

Optionally, the first, second, and third directions are coplanar (when considered as positionless vectors). The associated first, second and third paths (having positions as well as directions) preferably lie in a common plane. Alternatively the third direction may not be coplanar with the first and second directions—e.g. the third direction may be orthogonal to the plane containing the first and second directions.

The third waveguide may optionally be arranged to receive the third input light from a third output of the optical splitter. In this way, the optical component may generate a three beam interference pattern with only one input light beam. Embodiments of the present invention may enable illumination light patterns to be generated that are more complex than can be achieved using conventional far-field optics.

In some embodiments, the optical component comprises a fourth waveguide arranged to receive fourth input light and to use total internal reflection to direct the fourth input light into the sample region along a fourth path in a fourth direction that is different from the first, the second, and the third directions.

In this case, it will be seen by those skilled in the art that a single optical component (e.g. an optical chip) forms four separate light beams and directs these into the sample region along different directions, although not necessarily all at the same time. In particular, two different pairs of light beams may be formed and directed into the sample region along different directions. For example, the first input light from the first waveguide, and the second input light from the second output of the optical splitter may be directed into the sample region to form a first pair of interfering light beams. The third input light from the further waveguide and the fourth input light from the fourth waveguide may be directed into the sample region to form a second pair of interfering beams. In this way, different pairs of interfering beams may be activated at different times by selectively receiving input light at the optical splitter or receiving third and fourth input light at the further and fourth waveguides, respectively. This facilitates the generation of at least two distinct interference patterns at different orientations relative to the sample region, suitable for SIM image processing. Of course, a four-beam interference pattern may also be generated in the sample region by receiving input light at the optical splitter and receiving third and fourth input light at the further and fourth waveguides, respectively.

Methods embodying the invention may therefore further comprise the steps of:
  receiving fourth input light in a fourth waveguide of the optical component;
  using total internal reflection within the fourth waveguide to direct the fourth input light into the sample region along a fourth path in a fourth direction, wherein the fourth direction is different from the first, the second, and the third directions;
  interfering the first input light with the second input light to form a first periodic light pattern in the sample region; and
  interfering the third input light with the fourth input light to form a second periodic light pattern in the sample region.

Optionally, the third waveguide may receive third input light from a third output of the optical splitter. The fourth waveguide may receive fourth input light from a fourth output of the optical splitter. Alternatively, the optical component may comprise a second optical splitter and the third waveguide may be arranged to receive third input light from an output of the second optical splitter. The fourth waveguide may receive fourth input light from a different output of the second optical splitter.

It will be appreciated that the first pair of interfering light beams may form a first periodic light pattern within a sample region. The second pair of interfering light beams may form a second periodic light pattern within the sample region. The second periodic light pattern is preferably orientated differently relative to the sample region than the first periodic light pattern. The first and the second periodic light patterns may form linear fringes. The linear fringes of the first periodic light pattern may extend perpendicular to an axis of the sample region, and the linear fringes of the second periodic light pattern may extend perpendicular to a different axis of the sample region.

In use, light may be directed into the optical splitter so as to direct light into the sample region in the first direction and the second direction at the same time, so as to form a first periodic light pattern in the sample region. Additionally or alternatively, light may be directed into the sample region in the third direction at the same time as light is directed into the sample region in the fourth direction, so as to form a second periodic light pattern in the sample region. Alternatively or additionally, light may be directed into the sample region in the third direction at the same time as light is directed into the sample region in the first and the second directions, so as to form a third periodic light pattern in the sample region. Alternatively or additionally, light may be directed into the sample region in the fourth direction at the same time as light is directed into the sample region in the first and the second directions, so as to form a fourth periodic light pattern in the sample region. Alternatively or additionally, light may be directed into the sample region in the third and the fourth directions at the same time as light is directed into the sample region in the first and the second directions, so as to form a fifth periodic light pattern in the sample region. In this last case a four-beam interference pattern is generated.

The optical component preferably comprises an optical guiding layer (i.e. core layer). The optical component is preferably arranged to shield some or all of the input light from the atmosphere, by directing some or all of the light in the optical guiding layer. This optical guiding layer is preferably not air (although, of course, it may be adjacent to, or surrounded by, air); it is preferably solid. In this way, the optical component can minimise or avoid fluctuations in the interference pattern caused by random fluctuations in the atmosphere—e.g., due to fluctuations in the air flow and air composition—which might otherwise lead to random phase shifts between the interfering beams, and hence to undesirable instability in the interference pattern.

Further, it will be appreciated that, because the interfering beams formed by the waveguide splitter are derived from the same input light, any temporal fluctuations experienced by the input light prior to entering the waveguide splitter—whatever the cause—can be expected to affect each of the interfering beams in the same way. As such the fluctuations should not cause a relative phase shift between the interfering beams. An interference pattern generated by embodiments of the invention may therefore be more stable than the patterns formed with alternative SIM techniques that use propagating light fields in, for example, free-space.

In a preferred set of embodiments, the optical component is used in a system that comprises an imaging unit that uses an objective lens to collect light emitted from a sample in the sample region. The objective may be part of the imaging unit, or a separate component. Conventional SIM techniques use the same objective to direct light into the sample region, for generating an interference pattern, and also for imaging a sample. Embodiments of the present invention, however, use the optical component to direct light onto the sample, independently of the imaging lens. Thus, the objective lens of the imaging unit can be optimised solely for collecting light from the sample. In particular, a lower numerical aperture lens may be used compared with prior-art techniques because the lens is not required to focus illumination light very finely, so can advantageously provide a wider field of view for imaging a sample more extensively, without loss of optical resolution. Where the sample region is adjacent one face of the optical component, the imaging unit may collect light directly from the sample region—e.g., the objective lens may be located on the same side of the optical component as the sample region—or the imaging unit may collect light that passes through the optical component from the sample region—e.g., with the objective lens located on an opposite side of the optical component as the sample region.

Preferably, the optical component is a photonic integrated component. That is, for example, the optical component may be a photonic integrated circuit (PIC) or integrated optical circuit. In general a PIC will comprise at least two sections, with at least one waveguide (e.g. one-dimensional or two-dimensional waveguide) therebetween.

The optical component is preferably a monolithic component. It preferably contains no independently movable parts. The elements (e.g. optical splitter(s), waveguide(s), and sample region(s)) of the optical component are preferably bonded to one another, directly or indirectly. They may be grown or deposited on a common substrate. The elements of the optical component may comprise one or more of semiconductor material and dielectric material (e.g. silicon dioxide). The semiconductor material and/or dielectric material may be grown on a substrate (e.g. glass, silicon, or a group III-IV material substrate). For example, semiconductor material and/or dielectric material may be grown by means of an epitaxial process (e.g. molecular beam epitaxy) or a deposition process (e.g. a sputtering process or chemical vapour deposition). The elements of the optical component may be monolithically integrated onto a substrate of the optical component, which may be a planar substrate. Integrating the elements further ensures that the input light received by the optical component is shielded from the effects of a fluctuating environment (e.g. fluctuating temperature). Thus, it will be appreciated that the optical components disclosed herein function to simultaneously direct the light and shield the light so as to reduce phase fluctuations in the interfering light beams. In this way, separate opto-mechanical components are not required for (i) guiding light, and (ii) shielding light from changes in temperature, humidity and/or airflow. Advantageously, therefore, the optical components disclosed herein can be made smaller and cheaper than prior-art arrangements.

A substrate of the optical component may be, or may comprise, silicon or glass. The substrate preferably has a maximum or average (e.g. mean) thickness of less than 200 micrometres, such as 160-170 micrometres. In some embodiments, the substrate may be transparent, to enable light to be collected from the sample region through the substrate.

In some embodiments, the first direction may be parallel and opposite to the second direction. Accordingly, the first and second input light within the sample region may be counter propagating beams. The periodic interference pattern generated by interfering two counter propagating beams is typically substantially striped.

In some other embodiments, the second direction may be angularly offset relative to the first direction at an angle of less than 180 degrees. Optionally, the angular offset may be less than 20, 40, 60, 80, 100, 120, 140 or 160 degrees.

In general, the periodic light pattern generated by embodiments of the invention may have any form. It is not limited to any particular spatial period, or to any particular number of periodic repetitions (three instances of a common element would typically be a minimum in order to establish a pattern as having a periodic structure, but there may be millions of repetitions or more). The pattern may be simple—e.g., straight stripes—or more complex—e.g., a pattern of spots, which exhibits a regular structure. The pattern may be periodic in one dimension only, or in two or three dimensions. The period in each dimension may differ. It will be appreciated that the period in any one dimension may vary over the pattern—e.g., increasing slowly with distance, away from a central region—without this preventing the pattern from being seen as periodic.

Typically, the fringe period will equal $\lambda_o/2 \cdot n_{eff} \cdot \sin \varnothing$, where $\lambda_o$ is the wavelength of the light directed in the first and second directions, $n_{eff}$ is the effective refractive index of the guided mode, and $\varnothing$ is the offset angle between the first and second directions. This formula allows a desired fringe period to be generated, by appropriate choices of the wavelength and offset angle. If the offset angles between pairs of the directions are not all the same, this can allow for fringe patterns to be generated with different periods, even for the same wavelength of input light (albeit in different orientations). Being able easily to change the fringe period may be useful in certain imaging applications, for example, when imaging using lower magnification and lower numerical-aperture objective lens (to enable a wide field of view), where it might be necessary to change the fringe period of the illumination pattern to fill the Fourier space.

As mentioned previously, in some embodiments, the optical component may comprise a fourth waveguide arranged to receive fourth input light and to use total internal reflection to direct the fourth input light into the sample region, as a fourth light beam, along a fourth path in a fourth direction that is different from the first, the second, and the third directions.

In some embodiments, the first, the second, the third, and the fourth directions are coplanar (when considered as positionless vectors). The first and the second paths may lie along a first axis through the sample region, but in opposite directions. The third and the fourth directions may lie along a second axis through the sample region, but in opposite directions. The second axis may be angularly offset from the first axis. The angular offset between the first axis and the second axis may equal 90 degrees, but the axes are preferably offset with an acute angle that is less than 90 degrees, and may be less than 10, 20, 30, 40, 45, 50, 60, 70, or 80 degrees.

In other embodiments, the third direction may be angularly offset relative to the first direction at an angle of less than 180 degrees. The angular offset may be less than 20, 40, 60, 80, 100, 120, 140 or 160 degrees. The fourth direction may be angularly offset relative to the third direction at an angle of less than 180 degrees. The angular offset may be less than 20, 40, 60, 80, 100, 120, 140 or 160 degrees.

The fourth waveguide may be arranged to receive the fourth input light from a fourth output of the optical splitter. In this way, the optical component may generate a four-beam interference pattern with only one input light beam.

Alternatively, the fourth waveguide may be arranged to receive the fourth input light from a second output of the second optical splitter. In this way, the optical component may be switched between generating an interference pattern by the first and the second light beams interfering (e.g. along the first axis through the sample region), and generating an interference pattern by the third and the fourth light beams interfering (e.g. along the second axis through the sample region) depending on whether input light is received at the first optical splitter or at the second optical splitter.

In some embodiments, the optical component is arranged to direct input light into the sample region in five, six, seven, eight, or more different directions, along respective paths. In one set of embodiments, the optical component is arranged to direct light into the sample region in opposite directions along each of three different axes. The optical component may comprise three optical splitters, each having two outputs that are coupled to two respective waveguides which are arranged to direct light in respective opposite directions along a respective one of the three axes. The three axes may be coplanar and may be regularly spaced rotationally—i.e., at 120 degrees to each other. This enables a sample in the sample region to be illuminated with fringe patterns in three different orientations, rotated 120 degrees to each other, which allows known SIM processing techniques to be easily used.

In some embodiments, the optical component may comprise a grating optically coupled to the sample region. The optical grating may be arranged to direct received light into the sample region along the third path in the third direction. The third waveguide may be optically coupled to the grating so as to direct third input light into the sample region in the third direction via the grating. It will be appreciated that the third waveguide may receive third input light from an external source,—e.g. in systems herein, a light injecting device may inject third input light into the third waveguide. Preferably, light directed into the sample region in the first direction and the second direction lies in a first plane, and the third direction does not lie in the first plane. The third direction may be perpendicular to the first plane.

Alternatively, the third waveguide may be optically coupled to the first waveguide so as to receive at least some of the light from the first waveguide. The optically coupled arrangement of the first waveguide and the third waveguide may form a directional coupler (e.g. evanescent waveguide coupler). Thus, light entering the first waveguide may be split so that a portion of the received light will propagate in the first waveguide, and another portion of the received light will propagate in the third waveguide.

In some embodiments, arranged to use an optical grating to direct light into the sample region in a third direction which does not lie in the same plane as the first and the second directions, the optical component may be arranged to direct the first and the second input light into the sample region via a respective first waveguide and second waveguide. The applicant has realised that it is not essential that the first waveguide and the second waveguide receive light from an optical splitter.

Thus, from another aspect there is provided an optical component for illuminating a sample region with a periodic light pattern, the optical component comprising an optical grating, a first waveguide, a second waveguide, and a third waveguide, wherein:

the first waveguide is arranged to use total internal reflection to direct first input light into the sample region along a first path in a first direction;

the second waveguide is arranged to use total internal reflection to direct second input light into the sample region along a second path in a second direction;

the third waveguide is arranged to receive third input light and to use total internal reflection to direct the third input light onto the optical grating;

the optical grating is arranged to direct the received third input light into the sample region along a third path in a third direction;

the first direction and the second direction are different directions contained in a first plane; and the third direction is different from the first direction and from the second direction and does not lie in the first plane.

From a further aspect, the invention provides a method for illuminating a sample region of an optical component, the optical component comprising an optical grating, a first waveguide, a second waveguide, and a third waveguide, the method comprising:

receiving first input light in the first waveguide;

using total internal reflection within the first waveguide to direct the first input light into the sample region along a first path in a first direction;

receiving second input light in the second waveguide;

using total internal reflection within the second waveguide to direct the second input light into the sample region along a second path in a second direction;

receiving third input light in the third waveguide;

using total internal reflection within the third waveguide to direct the third input light onto the optical grating; and using the optical grating to direct the third input light into the sample region along a third path in a third direction, wherein the first direction and the second direction are different directions contained in a first plane, and wherein the third direction is different from the first direction and from the second direction and does not lie in the first plane.

In use, it will be appreciated that the first input light, the second input light, and the third input light (which travels in a different plane from the first and the second input light) interfere within the sample region to form a three-beam interference pattern. The resulting three beam interference pattern has been found to be particularly useful for 3D SIM imaging.

Any of the features mentioned in connection with other aspects of the invention may be features of this aspect also.

In embodiments of any aspect in which the first input light and the second input light are directed into the first waveguide and the second waveguide respectively from an optical splitter, a three-beam interference pattern can be generated conveniently and accurately from only one input beam into the optical splitter, and the third input light. In embodiments in which the third waveguide is optically coupled to the first waveguide so as to receive at least some of the light from the first waveguide as third input light, it will be seen that the three-beam interference pattern may be generated conveniently and accurately from only one input beam into the optical splitter of the optical component.

In preferred embodiments, the optical component comprises a substrate, and the optical grating is arranged between the sample region and substrate of the optical component. Preferably, the grating is arranged directly beneath the sample region. In this way, the grating may direct third input light into the sample region in the third direction from beneath the sample region. Preferably, the third waveguide is arranged in between the sample region and the substrate. The third waveguide may be located adjacent to the grating, and preferably in the same plane as the grating.

The optical component may be substantially planar, or may comprise a planar substrate. The component or substrate may therefore define a plane. The first and the second directions may (when regarded as positionless vectors) lie in the plane of the optical component. The third direction may also lie in the plane, or it may be angled relative to the plane.

The optical component preferably comprises an input interface. The input interface may be optically coupled to any one or more—and preferably to all—of the waveguides; this may be means of one or more coupling waveguides on the optical component. The input interface may be coupled to the optical splitter by a coupling waveguide. The input interface may be distributed across a plurality of faces of the optical component, but is preferably formed on one face of the optical component. The input interface may be provided by a single socket or other connection means, which may comprise a plurality of input ports. Each input port may correspond to a respective set of one or more waveguides; these sets may overlap. The input interface may be arranged to couple with one or more fibre optic cables (e.g. a fibre array or fibre adaptor) which can provide input light to the optical component. The use of such an input interface can simplify the connection and set-up process.

The optical component may comprise a first input port and a second input port. The first and second input ports may both be optically coupled to the first waveguide—for example, the optical component may comprise an optical combiner which has a first input optically coupled to the first input port, a second input optically coupled to the second input port, and an output optically coupled to the first waveguide. The optical combiner could comprise a y-branch waveguide junction. The optical combiner may be located downstream from the optical splitter. The first and second input ports may also both be optically coupled to the second or third waveguide. For at least some wavelengths of input light, the optical component may be arranged so that providing the input light to the first input port creates a first interference pattern in the sample region, while alternatively providing the input light to the second input port creates a second interference pattern in the sample region, the first and second interference patterns have a common orientation but the second interference pattern is offset (i.e. phase shifted) from the first interference pattern.

In some embodiments of the methods disclosed herein, any one or more of the first, the second (when present) or the third waveguides additionally receives respective first, second, or third auxiliary input light, preferably of the same wavelength as the first, second and third input light. The first waveguide may direct the first auxiliary input light into the sample region along the first path in the first direction. Similarly, when present, second waveguide may direct the second auxiliary input light into the sample region along the second path in the second direction. The third waveguide may direct the third auxiliary input light into the sample region along the third path in the third direction. Thus, it will be appreciated that a two-beam interference pattern or a three-beam interference pattern may be generated within the sample region with auxiliary input light. The first auxiliary input light within the sample region may have a non-zero phase offset relative to the first input light within the sample region. This may be achieved by the optical chip having a difference in optical path length from an input to the optical component and the sample region between the first input light and the first auxiliary input light. The second auxiliary input light within the sample region may have a non-zero phase offset relative to the second input light within the sample region. The third auxiliary input light within the sample region may have a non-zero phase offset relative to the third input light within the sample region. In this way, by selectively inputting the auxiliary light, instead of the input light, for one or more of the first, second and third waveguides, a lateral shift in an interference pattern can be obtained.

The optical chip may comprise first and/or second and/or third auxiliary waveguides. Any one or more of the first, the second, and the third waveguides may be optically coupled—e.g., via an optical combiner—to a respective first, second and third auxiliary waveguide. The first, the second and the third auxiliary waveguides may be respectively arranged to direct the first, the second and the third auxiliary input light into the first, the second and the third waveguides. Preferably, any one or more of the first, the second and the third auxiliary waveguides are arranged to respectively receive first, second and third auxiliary input light from one or more auxiliary waveguide splitters. The one or more auxiliary waveguide splitters are preferably part of the optical component.

Of course, it will be appreciated that it is not essential to offset the phase of the auxiliary input light with the auxiliary waveguides and that in some embodiments the auxiliary input light received by one or more elements of the optical component may inherently have a non-zero phase offset relative to the input light.

It will be appreciated that offsetting the phase of one of more of the interfering auxiliary input light beams within the sample region may generate an interference pattern that is different from any one of the interference patterns generated by interfering two or more of the input light beams within the sample region. For example, the auxiliary interference pattern generated by directing first auxiliary input light into the sample region in the first direction and second auxiliary input light into the sample region in the second region, will be different from the interference pattern generated by directing first input light into the sample region in the first direction and second input light into the sample region in the second region. In particular, it will be appreciated that the position of the interference fringes in this auxiliary interference pattern will be different.

In embodiments comprising a fourth waveguide, the fourth waveguide may be arranged to receive fourth auxiliary input light and direct the fourth auxiliary input light into the sample region along the fourth path in the fourth direction. In this case, the fourth waveguide may be optically coupled to a fourth auxiliary waveguide. The fourth auxiliary waveguide may direct fourth auxiliary input light into the fourth waveguide. The fourth auxiliary waveguide may receive fourth auxiliary input light from the auxiliary waveguide splitter.

Advantageously, therefore, the fringes in a generated periodic light pattern within the sample region may be shifted axially by selecting to interfere either auxiliary input light or input light.

In some embodiments, any one of the first, the second (when present), the third, or the fourth (when present) waveguides may receive auxiliary input light from the output of a respective auxiliary waveguide splitter. In this case, the optical path from an output of the auxiliary waveguide splitter to the sample region may be longer than the optical path from the output of the first optical splitter, or another of the auxiliary waveguide splitters, to the sample region. It will be appreciated that the longer path length will offset the phase of the auxiliary input light relative to the input light.

Preferably, the first optical splitter may be a y-branch splitter, an evanescent waveguide coupler (also referred to herein as a directional coupler), or a multimode interference (MMI) component. An advantage of using an MMI is that it provides low loss splitting and may provide more than two outputs.

In some embodiments, at least one of the waveguides (e.g., at least the first waveguide) is arranged to guide the received light towards the sample region along a respective optical path, wherein said optical path has a width that increases in a direction towards the sample region. This can be useful for illuminating a larger area of the sample region with the received light, and thereby generating a larger interference pattern. The width preferably increases adiabatically, so that a single mode condition of the waveguide can be maintained; this may be useful for certain SIM imaging techniques.

The sample region is preferably located at least partly within or adjacent the optical component. The sample region may be defined, at least in part, by one or more surfaces of the optical component. These one or more surfaces may be coated with a bio-compatible layer, e.g., a layer comprising BSA (bovine serum albumin), PEG (polyethylene glycol), or PLL (poly-L-lysine) molecules. The optical component may define a sample well having one or more walls—e.g., four or more planar sidewalls. The sample region may be in the sample well. The sample region or sample well preferably comprises a base, which is preferably planar. The sample well may be defined at least in part by a cladding layer or region of the optical component. The sample well may be at least partly defined by one or more members (e.g., of polydimethylsiloxane) that abut the optical component, or that protrude from the optical component; these members may define an open or closed chamber.

In some embodiments, a face (e.g., a base) of the sample region may be defined by a surface of an optical guiding layer (i.e. core layer) of the optical component. The surface of the optical guiding layer may be exposed (e.g., to air or water), at least adjacent the sample region (at least, when no sample is present). For example, in some embodiments a fluid such as air or water is used as an upper cladding layer of the waveguide(s), in which case a base of the sample region may be defined by an upper surface of the optical guiding layer of the waveguide(s). In this way, a sample may be placed directly onto a waveguide, to interact with an evanescent field of guided light within the waveguide. In such arrangements a sample well may not always be needed, and a sample may be illuminated with an interference pattern by placing it directly onto a waveguide and guiding two counter propagating beams within the waveguide; however, in some cases a sample well may be provided, e.g. by a sample chamber placed on the waveguide surface, to contain the sample.

In one set of embodiments, at least the first waveguide comprises an end facet from which the light (e.g. first input light) that it receives is directed into the sample region. Preferably, the second waveguide (when present) comprises an end facet from which the input light that it receives (i.e. second input light) is directed into the sample region. Preferably, the third waveguide comprises an end facet from which the input light that it receives (i.e. third input light) is directed into the sample region. In such arrangements it will be appreciated that the end facets of at least the first and the third waveguides may define respective sidewalls of a sample well. Thus, the end facet of at least the first and the second waveguides may be positioned lateral to a surface area onto which the sample is positionable in the sample region. Further, at least one of these sidewalls may comprise at least one waveguide layer. The sample region may abut the end facet. Alternatively, there may be a medium, such as an air gap and/or a cell buffer solution (e.g., phosphate-buffered saline, PBS), between the end facet and the sample or sample region. The edge facet may be coated with a bio-compatible layer, e.g., comprising BSA (bovine serum albumin), PEG (polyethylene glycol), or PLL (poly-L-lysine) molecules.

Such arrangements advantageously enable fluorophores (or other such light emitting markers embedded within the sample) to be excited beyond a surface region of the sample—e.g., deeper into the sample than an evanescent field of the waveguide penetrates, which is typically a few hundreds of nanometres.

Such arrangements also allow fluorophores (or other such light emitting markers) to be efficiently excited at relatively high power, for a given light source (e.g. laser), compared with known evanescent-field-based illumination techniques, in which excitation powers are relatively low—typically less than about 10% of the total input light power.

The light from the end facet of at least the first waveguide is preferably shaped as a light sheet. The light sheet preferably enters the sample region in a plane substantially parallel with a principal plane of the optical component (e.g. the plane of a planar substrate of the optical component). By generating a light sheet preferably the entire cross section of a sample region may be illuminated. Accordingly, a periodic interference pattern may illuminate the entire cross section of the sample region.

The thickness of a light beam or light sheet emanating from the end facet of at least the first waveguide is preferably less than 500, 1000 or 2000 nanometres. To facilitate this, the waveguide layer of at least the first waveguide may be deposited as a light-transmitting thin film of transparent material. This thin film may have a thickness of less than 1 micrometre.

In another set of embodiments, at least the first waveguide is arranged to direct into the sample region only an evanescent field component of the light that it receives. In such embodiments, the sample region is preferably in contact with at least the first waveguide.

Any one or more of the waveguides may comprise a respective first core region and first cladding region in contact with the first core region, the first core region having a higher refractive index than the first cladding region and being arranged to guide received light along the waveguide using total internal reflection. Preferably two or more of the waveguides (e.g., the first and second waveguides) comprise the same core and cladding regions. One of more of the optical splitters (e.g. the first optical splitter) may comprise the same core and cladding regions. The first cladding region (e.g. a lower optical cladding region) of the waveguide(s) and/or optical splitter(s) may be arranged between the first core region and a substrate of the optical component. In some embodiments, the first core region may be arranged between the first cladding region and a second cladding region (e.g. an upper optical cladding region). The second cladding region preferably has a lower refractive index than the first core region. In some embodiments, air or water may be used as the second cladding region; in this case, a region of air or water may be regarded as constituting the second cladding region and forming part of the optical component, or the air or water may be regarded as being separate from the optical component, such that the optical component does not itself comprise an upper cladding layer.

Terms such as "upper", "lower", "well" and "base", as used herein, should not be understood as necessarily limiting the optical component to being used at any particular angle of inclination. However, in some embodiments, gravity may be used to retain a sample in the sample region, and the optical component may then have a natural angle of use, or range of usable angles.

In conventional SIM set-ups where the illumination pattern if formed with an imaging objective lens, the optical resolution of SIM is approximately $\lambda_o/4.N.A.$, where N.A. is the numerical aperture of the objective lens. Typically, the highest N.A. used in such conventional techniques is 1.49, and in some cases the sample is immersed in solution having a refractive index which is close to that of water (i.e. around 1.33).

At least some of the arrangements disclosed herein have an optical resolution of $\lambda_o/2(N.A.+n_{eff})$, where $n_{eff}$ is the effective refractive index of the guided mode inside the waveguide, and N.A. is the numerical aperture of an imaging objective. This allows the resolution to be improved by using an $n_{eff}$ that is higher than N.A. This is possible by using suitably high refractive index elements in the optical component to direct light for interference within the sample region. For example, an $n_{eff}$ of around 1.9 to 2 can be achieved using tantalum pentoxide or silicon nitride waveguides.

The spacing between fringes in a light pattern is typically proportionate to $\lambda_o/2n_{eff}$, where $\lambda_o$ is the wavelength of the interfering beams in a vacuum and $n_{eff}$ is the effective refractive index of the guided mode inside the waveguide. In some prior-art arrangements, $n_{eff}$ is typically around 1 to 1.33 as most or all of the energy of the interfering beams, in the interference region, lies in an air- or water-based medium.

In embodiments of the present invention (e.g. embodiments in which evanescent light forms a periodic light pattern), where a light pattern is formed by interfering light beams that have most of their light energy within one or more light-directing elements (e.g. in a waveguide that directs light into the sample region, or an optical splitter that directs light into the sample region), it will be appreciated that the effective refractive index experienced by the interfering light will be dependent on the refractive index composition of the light-directing elements, rather than principally air or water, and, as a result, $n_{eff}$ may be made higher than 1.33 because the light-directing elements can be manufactured from materials having refractive indices higher than 1.33. For example, $n_{eff}$ values of around 1.7 to 2 can be obtained in waveguides comprising a tantalum pentaoxide or silicon nitride core layer and silicon cladding layers.

Higher $n_{eff}$ values reduce the spacing between the fringes in the interference pattern which is desirable because it increases the resolution of the SIM image. Preferably, therefore, in some embodiments, at least one of the waveguides comprises tantalum pentaoxide or silicon nitride, preferably in the core layer. Preferably, at least one of the waveguides has a cladding layer comprising silicon. Preferably, the optical component is such that $n_{eff}$ is greater than 1.33 in the sample region and preferably at least 2—e.g., 2.5, 3, 3.5 or more.

In embodiments in which the sample region comprises a sample well for holding a sample, the sample well may be at least partially defined by one or both of the first cladding region and the first core region.

The first cladding region of the first waveguide, and preferably the second waveguide (when present), may be shaped to define, at least partially, the sample region (e.g. a sample well) for holding the sample. In particular, one or both of the first cladding region and the first core region may be shaped to define a sample well or sample region (e.g. providing a base plane for a sample region or well).

In one set of embodiments, at least the first waveguide is a one-dimensional waveguide or is a two-dimensional waveguide. In some embodiments, one or more of the waveguides is a single-mode waveguide. In some embodiments, one or more of the waveguides is a two-dimensional rib waveguides, or a two-dimensional strip waveguide, or a one-dimensional slab waveguide.

In rib waveguides, it will be appreciated that transverse optical guiding (i.e. in a direction normal to a plane of the core and cladding layers/regions) is provided by a refractive index contrast between the core layer and the cladding layers. Lateral optical guiding is provided by having a ridge in the upper cladding layer. The lateral optical guiding in the rib waveguide structure increases the intensity of the evanescent light (i.e. evanescent field) propagating outside the core layer. Accordingly, compared with using a conventional slab waveguide structure (which does not have a ridge) the intensity of the evanescent light overlapping the sample region can be increased. Thus, by using a rib waveguide, the intensity of evanescent light directed into the sample region from a rib waveguide can be increased allowing a more intense periodic light pattern to be generated.

Another benefit of using rib waveguides compared with slab waveguides (which only provide transverse optical guiding) is that they allow sharper bends and turns with less light leakage. In this way, sharper bends and turns in the waveguide can be used to provide a more compact optical component with a reduced footprint. In particular, sharper bends and turns in the waveguide can be used to direct input light from one side of the optical component (e.g. from the input face) to different sides of the sample region and along different directions within the sample region to generate different periodic light patterns.

To further reduce bend losses in the waveguide, and thereby enable even sharper bends and turns for making the optical component even more compact, one or more of the waveguides in the embodiments herein may comprise a strip waveguide. Strip waveguides also have a ridge that provides lateral optical guiding.

However, unlike in rib waveguides, the ridge extends through the upper cladding layer and through (or at least part way through) the core layer of the waveguide.

A further benefit of using strip waveguides is that provide an intense evanescent field propagating outside the core layer. Accordingly, in embodiments where only the evanescent field (i.e. evanescent light) is directed into the sample region, the intensity of the periodic light pattern illuminating the sample may be increased by using a strip waveguide to direct light into the sample region.

In some embodiments, one or more of the waveguides may be slab waveguides, particularly in cases where high power and sharp bends/turns are not required. It will also be appreciated that slab waveguides may in some cases be preferable because they can be easier to fabricate than rib and slab waveguides.

The width of the slab waveguide structure may be from 100 μm to 500 μm, or 100 μm to 150 μm, or 100 μm to 200 μm, or 100 μm to 300 μm, or 100 μm to 400 μm, although it could potentially lie outside these ranges. The width, $r_w$, of a ridge in a rib waveguide or a strip waveguide may be:

1 µm≤$r_w$<100 µm; or 1 µm $r_w$≤10 µm; or 10 µm≤$r_w$≤30 µm; or 10 µm≤$r_w$≤50 µm; or 10 µm≤$r_w$<100 µm, although it could potentially lie outside these ranges.

Optionally, at least one of the waveguides (e.g., the first or second waveguide) is coupled to a respective phase adjuster that is arranged to adjust the phase of at least a portion of the received light (e.g., the first input light) before it is directed into the sample region. The optical component may comprise one or more of said phase adjusters.

Preferably, the phase adjustor (or adjustors) is an active phase adjuster such as a thermal phase adjustor or an electro-optic phase adjustor. However, the phase adjustor (or adjustors) may be a passive phase adjustor. A passive phase adjustor may, for example, comprise a fillable gap in the upper cladding layer of a respective waveguide to which the phase adjustor is coupled, which may be suitable for selective filling with one or more materials of different refractive indexes (e.g. Silicon dioxide, PMMA, or SU8) so as to change the effective refractive index of the waveguide.

The speed of current active phase adjusters is over 1 GHz which is much faster than current opto-mechanical components that typically have modulation speeds in the kHz range. Accordingly, the phase adjustors can enable the periodic light pattern to be shifted relative to the sample region at much faster rates than prior-art opto-mechanical set-ups.

Any one or more of the waveguides may be a two-dimensional waveguide having a curved or angled portion that curves or angles towards the sample region and is arranged to use total internal reflection to direct respective input light along the curved or angled portion and into the sample region.

The use of such a two-dimensional waveguide is believed to be novel and inventive, even when the optical component does not necessarily comprise an optical splitter.

Thus, according to further aspect, the invention provides an optical component for illuminating a sample region with a periodic light pattern, the optical component comprising:
an input interface arranged for receiving input light;
a first waveguide arranged to receive first input light from the input interface and to use total internal reflection to direct the first input light into the sample region along a first path in a first direction;
a second waveguide arranged to receive second input light from the input interface, wherein the second waveguide is a two-dimensional waveguide having a curved or angled portion that curves or angles towards the sample region and wherein the second waveguide is arranged to use total internal reflection to direct the second input light along the curved or angled portion and into the sample region along a second path in a second direction; and
a further waveguide arranged to receive third input light from the input interface and to use total internal reflection to direct the third input light into the sample region along a third path in a third direction,
wherein the second direction is different from the first direction, and the third direction is different from the first direction and from the second direction so that, in use, the second input light interferes with at least one of the first input light and the third input light to form a periodic light pattern in the sample region.

According to another aspect, the invention provides a method for illuminating a sample region of an optical component comprising an input interface, a first waveguide, a second waveguide, and a third waveguide, wherein the second waveguide is a two-dimensional waveguide having a curved or angled portion that curves or angles towards the sample region, the method comprising:
receiving first input light, from the input interface, in the first waveguide;
receiving second input light, from the input interface, in the second waveguide;
using total internal reflection within the first waveguide to direct the first input light into the sample region along a first path in a first direction;
using total internal reflection within the second waveguide to direct the second input light along the curved or angled portion of the second waveguide and into the sample region along a second path in a second direction, wherein the second direction is different from the first direction;
receiving third input light, from the input interface, in the third waveguide;
using total internal reflection within the third waveguide to direct the third input light into the sample region along a third path in a third direction, wherein the third direction is different from the first direction and the second direction; and
interfering the second input light with at least one of the first input light and the third input light to form a periodic interference pattern within the sample region.

The features and advantages described above in relation to an optical component and method in accordance with the preceding aspects, and to its waveguides, including the preferred and optional features and advantages, may be applied equally to embodiments of this optical component and method, wherever appropriate.

It will be seen by those skilled in the art that a single optical component (e.g. an optical chip) forms three separate light beams and directs these into the sample region along different directions using three waveguides (although not necessarily all at the same time). Specifically, it will be seen that the first waveguide directs the received first input light from the input interface into the sample region, as a first light beam, in a first direction. The second waveguide is a two dimensional waveguide and has a curved or angled portion that curves or angles towards the sample region so as to direct the received second input light from the input interface into the sample region, as a second light beam, in a second direction which tends towards the first light beam. The third waveguide (also referred to herein as the further waveguide) directs the received third input light from the input interface into the sample region, as a third light beam, in a third direction.

For example, it will be appreciated that the third input light may interfere with the first and the second input light so as to form a three-beam interference pattern. A three-beam interference pattern is useful for generating a "speckled" or "semi-speckled" illumination pattern. A speckle like illumination pattern is useful for some types of SIM imaging. Alternatively, the second input light may either interfere with the first input light or the third input light to form two different interference patterns. Advantageously, the two different interference patterns can be formed without having to re-align the optical component. A third interference pattern may be generated by interfering the first input light with the third input light.

Thus, as with the first aspect, it will be seen that an optical component embodying this aspect may avoid the need for multiple opto-mechanical components and may provide a smaller, cheaper and less complex set-up for SIM imaging, which is easier to align than currently known systems.

Further, by using a two-dimensional waveguide, the footprint of the optical component can be made much smaller by enabling a bend (i.e. curved or angled portion) to be used for directing the second input light into the sample region along the second direction. It will be appreciated that, because of the bend, the footprint of the second waveguide may be made much smaller than the footprint of prior-art alternatives.

In addition, it will be seen by those skilled in the art that an optical component in accordance with this aspect can also shield the input light from fluctuations in the atmosphere to minimise fluctuations in the interference pattern.

In some embodiments, the input interface may comprise an optical splitter having (i) an input for receiving input light from the input interface, (ii) a first output, and (iii) a second output, and wherein the first output is optically coupled to the first waveguide so as to direct the first input light into the first waveguide, and the second output is optically coupled to the second waveguide so as to direct the second input light into the second waveguide. In this way, the optical component may generate a periodic light pattern from only one input light beam and in some embodiments this input beam need only be received at one face of the optical component. As with the first aspect, this leads to a simpler SIM imaging set-up.

Preferably, the optical splitter may be a y-branch splitter, an evanescent waveguide coupler, or a multimode interference (MMI) component. An advantage of using an MMI is that it provides low loss splitting and may provide more than two outputs.

Optionally, the optical splitter may comprise a third output. The third output may be optically coupled to the third waveguide so as to direct the third input light into the third waveguide. In this way, the optical component may generate a three beam interference pattern with only one input light beam.

In some embodiments, the input interface comprises one or more of a first input, a second input, and a third input. The first input may be optically coupled to the first waveguide so as to direct the first input light into the first waveguide. The second input may be optically coupled to the second waveguide so as to direct the second input light into the second waveguide. The third input may be optically coupled to the third waveguide so as to direct the third input light into the third waveguide.

Preferably, at least the first input and the second input are positioned on a common peripheral edge or face of the optical component. This ensures that input light from a light source only needs to be directed to one side of the optical component.

Optionally, each of the first and/or the third waveguide may be a two-dimensional waveguide. The first waveguide and/or the third waveguide may comprise a curved or angled portion that curves or angles towards the sample region. The first waveguide may be arranged to use total internal reflection to direct the first input light along the curved or angled portion and into the sample region along the first direction. Thus, the first waveguide may use a sharper bend to direct the light with little light loss and in this way the optical component may be made even smaller. Additionally or alternatively, the third waveguide may be arranged to use total internal reflection to direct the third input light along the curved or angled portion and into the sample region along the third direction.

The first, second and/or third directions may be as previously described.

Optionally, the first, second, and third directions lie in the same plane. Alternatively, as described previously, the third direction could be in a different plane to the first and/or second directions—e.g. in an orthogonal plane. In the latter case, a three-beam interference pattern may be generated for 3D SIM imaging as mentioned previously.

Optionally, the third waveguide may be arranged to receive the third input light from a third input of the input interface. In this way, the optical component may selectively switch between a two beam interference pattern and a three beam interference pattern depending on whether or not input light is received at two or more inputs of the input interface.

In some embodiments, the optical component may comprise a fourth waveguide arranged to receive fourth input light and to use total internal reflection to direct the fourth input light into the sample region along a fourth path in a fourth direction that is different from the first, the second, and the third directions.

These four directions may have the same features and advantages as previously described.

In the aforementioned embodiments wherein the input interface comprises an optical splitter, the fourth waveguide optionally may be arranged to receive the fourth input light from a fourth output of the optical splitter. Alternatively, the fourth waveguide optionally may be arranged to receive the fourth input light from an output of another optical splitter of the input interface.

Alternatively, the fourth waveguide may be arranged to receive the fourth input light from a fourth input of the input interface. In this way, the optical component may selectively switch between different interference patterns depending on where input light is injected at the input interface. For example, in embodiments wherein the first, the second, the third, and the fourth input light beams are received from respective input ports of the input interface, an interference pattern may be generated by selectively injecting light into the first and the second inputs of the input interface to interfere the first and the second light beams (e.g. along the first axis of the sample region). Further, for example, an interference pattern may be generated by selectively injecting light into the third and the fourth inputs of the input interface to interfere the third and the fourth light beams (e.g. along the second axis of the sample region).

In some examples, the optical component may comprise a grating optically coupled to the sample region. The optical grating may be arranged to direct received light into the sample region along the third path in the third direction. The third waveguide may be optically coupled to the grating so as to direct third input light into the sample region in the third direction via the grating. Preferably, light directed into the sample region in the first direction and the second direction lies in a first plane, and the third direction does not lie in the first plane.

As with earlier aspects, at least one of the waveguides may be arranged to additionally receive auxiliary input light. For example, the first waveguide may be arranged to receive first auxiliary input light. As in embodiments of the first aspect, the first auxiliary input light preferably has a non-zero phase offset relative to the first input light. At least the first waveguide may be optically coupled to receive respective auxiliary input light from a respective auxiliary waveguide.

Preferably, the auxiliary waveguide(s) may receive auxiliary light from the input interface (e.g. from one or more waveguide splitters or inputs of the input interface). For example, a first and a second auxiliary waveguide that are respectively coupled to the first and the second waveguides may receive auxiliary light from an output of an auxiliary optical splitter of the input interface. Preferably, the optical path length of the auxiliary waveguides is not an integer multiple of the period of any one of the first, the second, the third, or the fourth input light.

As before, the auxiliary waveguide(s) enable the fringes in a generated periodic light pattern within the sample region to be shifted axially by selecting to interfere input light or auxiliary input light within the sample region. For example, the fringes in the interference pattern generated by interfering the first input beam with the second input beam within the sample region may be shifted axially by separately interfering the first auxiliary input beam with the second auxiliary input beam within the sample region.

As mentioned, at least the first auxiliary waveguide may receive auxiliary input light from the output of an auxiliary waveguide splitter of the input interface. Preferably, the output of this waveguide splitter has a longer optical path length than the output of the first optical splitter of the input interface (when present) that directs first input light into the first waveguide. It will be appreciated that the longer path length will offset the phase of the first auxiliary input light relative to the first input light. In this way, and as before, the arrangement of providing first input light or first auxiliary input light into the first waveguide provides a phase adjustor for adjusting the relative phase difference between the interfering beams.

Certain methods embodying the invention, according to any of the aspects described herein, further comprise using the periodic light pattern or light patterns to perform structured illumination microscopy (SIM). The analysis may be performed using a known SIM technique. Preferably the light pattern is adjusted linearly (e.g. axially) and/or angularly, using one or more of the mechanisms described herein, during the imaging. This adjustment may be done by an imaging unit or by a separate control unit.

Thus, from a further aspect, the invention provides a system for imaging a sample using structured illumination microscopy (SIM), the system comprising:
   a light-injecting apparatus;
   an optical component according to any aspect disclosed herein, arranged to receive input light from the light-injecting device and to illuminate the sample region with a periodic light pattern;
   an objective lens arranged to collect light emanating from the sample region; and
   an imaging unit arranged to perform structured illumination microscopy (SIM) with the collected light.

From another aspect, the invention provides a method of imaging a sample using structured illumination microscopy (SIM), comprising:
   illuminating a sample region of an optical component with an periodic light pattern, by any method disclosed herein;
   collecting light emanating from the sample region; and
   performing structured illumination microscopy (SIM) with the collected light.

The sample region preferably contains a sample—e.g., a biological sample. The sample preferably contains fluorescent markers, although this is not essential.

The applicant believes that such an imaging system, and its use for SIM, is also novel and inventive even when the optical component has fewer features than are described above.

Thus, from a further aspect, the invention provides a system for imaging a sample using structured illumination microscopy (SIM), the system comprising:
   a light-injecting apparatus;
   an optical component comprising a waveguide and an optical splitter, the optical splitter having (i) an input for receiving input light, (ii) a first output, and (iii) a second output, wherein:
      the first output of the optical splitter is optically coupled to the waveguide so as to direct first input light into the waveguide;
      the waveguide is arranged to use total internal reflection to direct the first input light into the sample region along a first path in a first direction;
      the second output of the optical splitter is optically coupled to the sample region so as to direct second input light into the sample region along a second path in a second direction; and
      the second direction is different from the first direction so that, in use, the first input light interferes with the second input light to form a periodic light pattern in the sample region;
   an objective lens arranged to collect light emanating from the sample region; and
   an imaging unit arranged to perform structured illumination microscopy (SIM) with the collected light.

From a yet further aspect, the invention provides a system for imaging a sample using structured illumination microscopy (SIM), the system comprising:
   a light-injecting apparatus;
   an optical component comprising:
      an input interface arranged for receiving input light;
      a first waveguide arranged to receive first input light from the input interface and to use total internal reflection to direct the first input light into the sample region along a first path in a first direction; and
      a second waveguide arranged to receive second input light from the input interface, wherein the second waveguide is a two-dimensional waveguide having a curved or angled portion that curves or angles towards the sample region and is arranged to use total internal reflection to direct the second input light along the curved or angled portion and into the sample region along a second path in a second direction, wherein the second direction is different from the first direction so that, in use, the first input light interferes with the second input light to form a periodic light pattern in the sample region;
   an objective lens arranged to collect light emanating from the sample region; and
   an imaging unit arranged to perform structured illumination microscopy (SIM) with the collected light.

Further aspects provide methods for imaging a sample using structured illumination microscopy comprising using a system according to either of the preceding two paragraphs.

In any of these aspects, the light-injecting apparatus may comprise a lens for focussing input light from a light source into the optical component. The light source may form part of the light-injecting apparatus. The light source is preferably a laser or any other coherent light source for generating a periodic light pattern. For example, the light source may be a laser light source such as a solid state laser, fibre laser or diode laser. The wavelength of the input light may be within the visible spectrum (e.g., around 400 to around 800 nanometres) or near-IR (e.g., around 800 to around 1500 nanometres). The first, second, third and fourth input light (where present) preferably has a common wavelength.

In other embodiments, the light-injecting apparatus may comprise an optical fibre that directs light from the light source into the optical component—e.g., at an input interface of the optical component. Alternatively, the fibre may direct light from the light source to the lens.

The system may comprise an optical multiplexer, such as an optical switch, which may be arranged to selectively direct the light from the light source along one or more of a plurality of paths. Each path may inject light into the optical component (e.g. into one or more different input ports of the input interface) by a lens or one or more optical fibres. By controlling which beams of light to output, the optical multiplexer allows selective control over which input, or combination of inputs, receives input light. In this way, an interference pattern in the sample region can be varied.

The optical multiplexers are preferably of the type used in telecommunication networks (e.g. 40G optical switches). This is advantageous as the generation of periodic light patterns is limited only by the speed of the optical multiplexer, rather than the movement of opto-mechanical components (e.g. movable mirror) as in prior-art set-ups. Indeed, current optical multiplexers, such as those in telecommunications, have modulation speeds of over 1 GHz and this is much faster than current opto-mechanical components which typically have modulation speeds in the KHz range.

Further, the light-injecting apparatus may comprise one or more amplitude modulators to adjust the amplitude of each beam of input light injected into the optical component. The amplitude modulators enable the intensity of the interference fringes in the periodic light pattern to be controlled.

Optionally, the light-injecting apparatus may be arranged to inject input light having one or more different wavelengths into the optical component. The different wavelengths of the input light may be generated by a tunable laser, or a set of light sources comprising a light source for each wavelength. The wavelength, or wavelengths, of the input light may be selected so as to cause light emitting markers to emit light. Different wavelengths of input light may be used to change the number of fringes and shift the position of the fringes relative to the sample.

In some embodiments, the imaging unit is also arranged to control a phase offset between the first input light and the second input light.

The imaging unit may comprise one or more of: image sensors, processors, memory, ASICs, FPGAs, DSPs, inputs and outputs. It may comprise memory storing software instructions for instructing the imaging unit to perform one or more steps of SIM imaging.

The imaging unit may be arranged to perform SIM imaging with light collected from a plurality of periodic light patterns in the sample region. It may be arranged to perform frequency analysis, such as Fourier analysis, with the collected light.

In some embodiments, the first direction and the second direction lie in a first plane, and the objective lens is also arranged to receive input light from the light-injecting apparatus and to direct input light into the sample region along a fourth direction, wherein the fourth direction does not lie in the same plane as the first and the second directions.

In all of the aspects, the interfering light may have the same polarisation. The elements of the optical component (e.g. at least the first waveguide and/or at least the first optical splitter) may be arranged to direct light with its polarisation in the plane of the core layer, or in the plane of the optical component (e.g. plane of the optical component's substrate). Interfering light with the same polarisation increases the visibility of the fringes, thereby providing a better SIM image. Visibility is at its maximum when interfering light which has its polarisation in the plane of the core layer, or plane of the optical component (e.g. plane of the optical component's substrate).

Features of any aspect or embodiment described herein may, wherever appropriate, be applied to any other aspect or embodiment described herein.

Where reference is made to different embodiments or sets of embodiments, it should be understood that these are not necessarily distinct but may overlap.

SPECIFIC DESCRIPTION

Certain preferred embodiments of the invention will now be described, by way of example only, with reference to the accompanying drawings, in which:

FIGS. 4a-4h are cross sectional profiles of three alternative types of waveguides, all according to the present invention;

FIG. 5 is planar view of a periodic interference pattern generated in the sample region of the optical component of FIG. 1;

FIGS. 8a, 8b and 8c shows planar views of three different illumination patterns that may be generated by changing the angle of a periodic light pattern within the sample region of the optical component of FIG. 7;

FIG. 9 is a planar view of a light injecting arrangement and an optical component according to the present invention;

Figure 1:
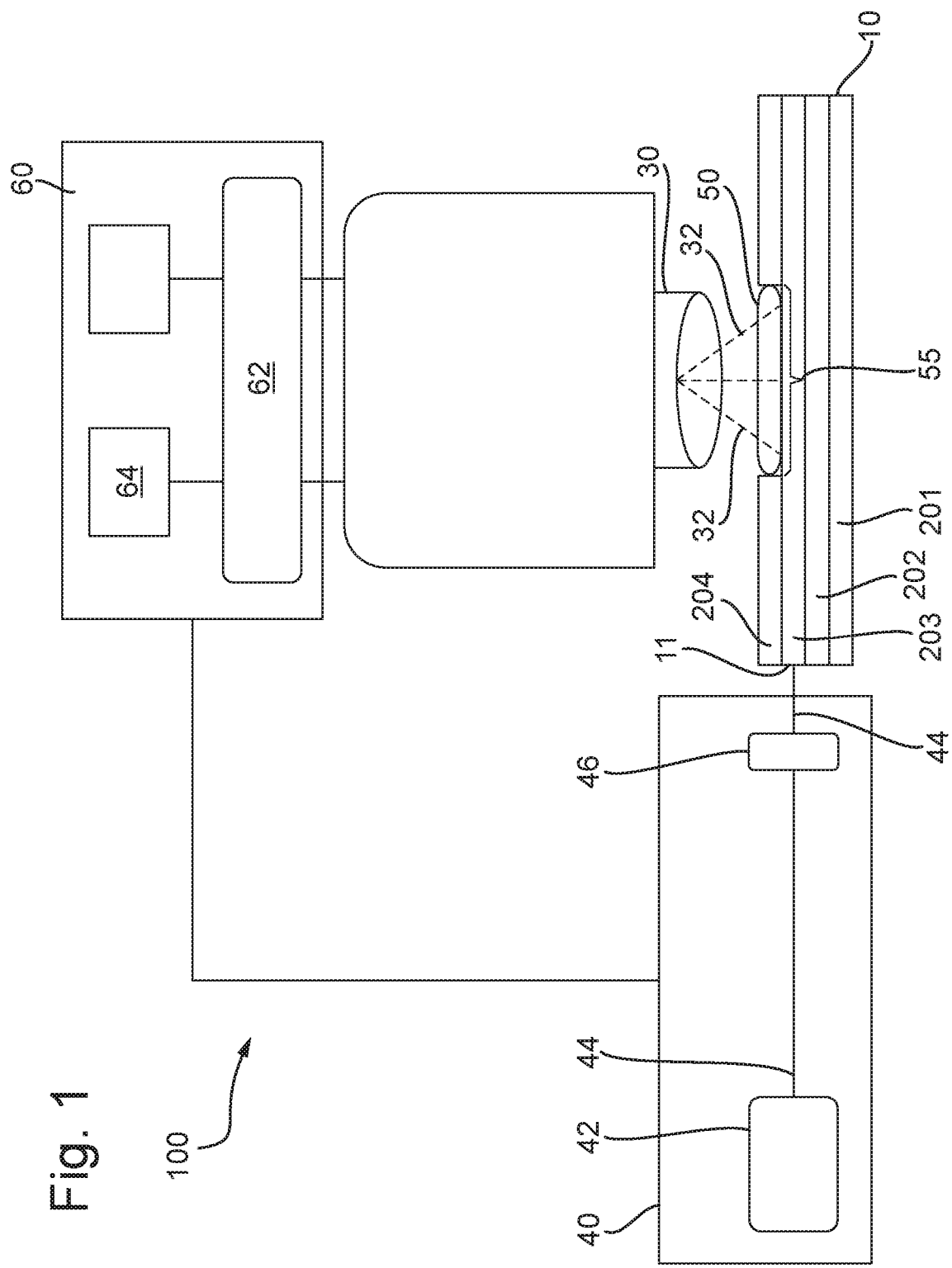
FIG. 1 is a schematic of a SIM imaging set-up comprising an optical component according to the present invention.

FIG. 1 shows an apparatus 100 for performing fluorescence microscopy, which includes an objective lens 30, such as a Plan N 20x/0.4 Olympus™ objective lens, having a forward field of view 32 that faces a sample region 55 of an optical component 10. It also includes a light-injecting device 40 optically coupled to an input interface 11 of the optical component 10. A sample 50 is positioned in a sample region 55. The apparatus 100 also includes an imaging unit 60 configured to receive and process the light collected by the objective lens 30 within the forward field of view 32.

The sample 50 in this example is a biological cell embedded with light emitting markers such as fluorophores or quantum dots, although other types of samples may, of course, be used. For example, the sample may be a biological cell with elastic and non-elastic scattering.

The light-injecting device 40 comprises a lens 46 and a light source 42 which, in this example, is a visible wavelength laser source. The lens 46 is arranged to receive the light 44 from the light source 42 and focus it into the input interface 11 of the optical component 10. This injected light forms input light for the optical component 10.

Figure 2:
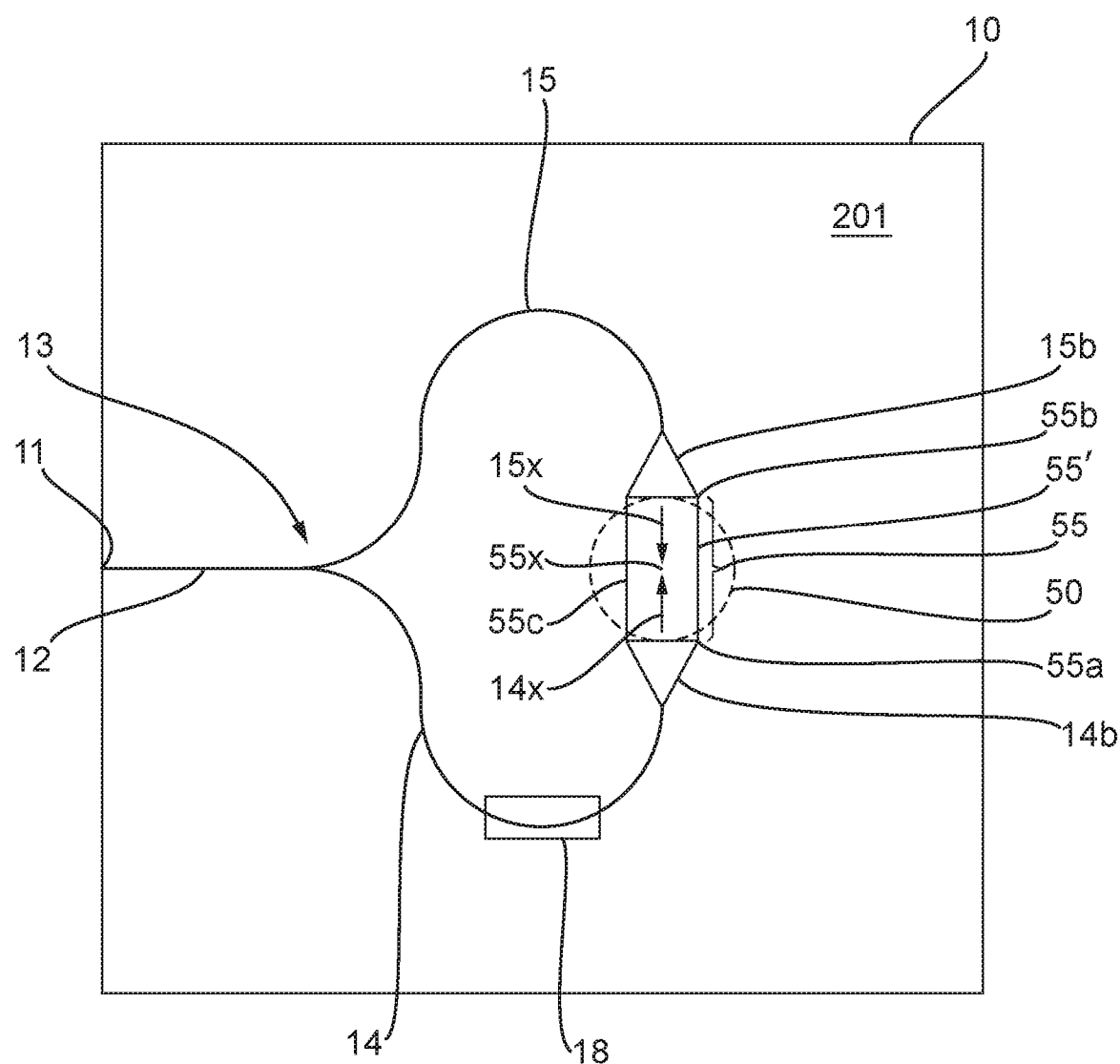
FIG. 2 is a planar view of the optical component of FIG. 1.

As best illustrated in FIG. 2, the input interface 11 of the optical component 10 comprises an input waveguide 12 which receives the input light from the light-injecting device 40. The input waveguide 12 is arranged to direct the input light into an optical splitter 13 which, in this example is a y-branch waveguide splitter, although it will be appreciated that it may be any other type of optical splitter such as a multimode interference coupler (MMI) or an evanescent waveguide coupler.

The two outputs of the y-branch splitter 12 are each optically coupled to a respective first and second waveguide 14, 15. The first and the second waveguides 14, 15 curve towards, and are optically coupled to, respective opposing sides 55a, 55b of the sample region 55 so as to direct two counter propagating beams of input light into the sample region 55 along parallel and opposing directions 14x, 15x. Directions 14x and 15x are both along axis 55x of the sample region 55.

It will be appreciated that directing two or more beams of light towards each other within the sample region 55 (along different directions, e.g. 14x, 15x) will cause the beams to interfere and generate a periodic interference pattern. The periodic interference pattern will illuminate the sample 50 and cause the light emitting particles within the sample 50 to emit light. The emitted light pattern may be used by the imaging unit 60 to perform structured illumination microscopy (SIM) of the sample 50.

FIG. 5 illustrates an example of a periodic light pattern generated by directing two counter propagating beams of input light into the sample region from waveguide 14 and 15 in FIG. 2. As will be described further below, the fringes of the periodic interference pattern may be shifted along axis 55x by adjusting the relative phase difference between the interfering light beams.

Figure 3:
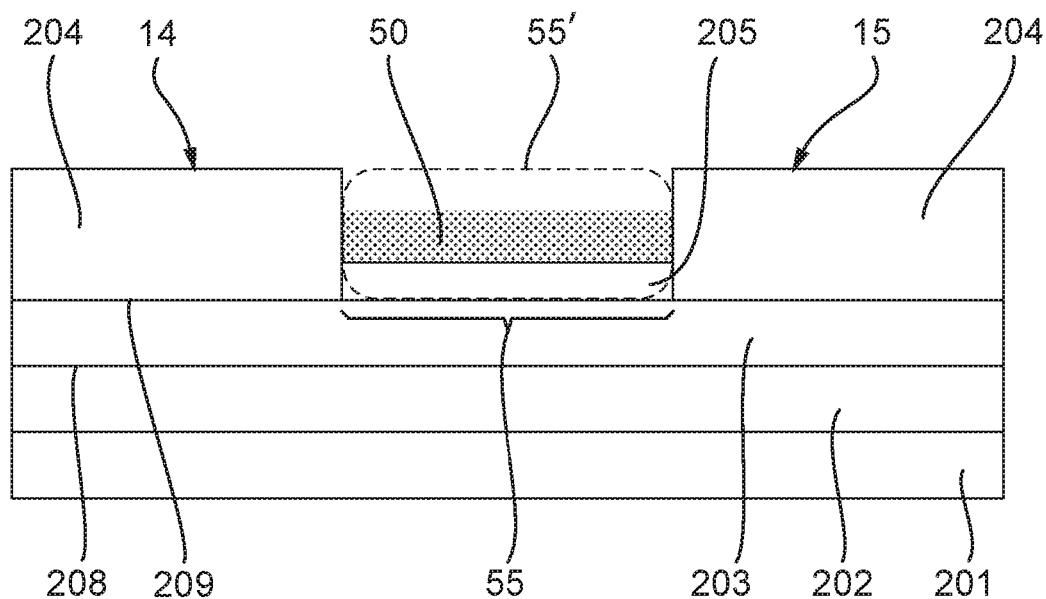
FIG. 3 is a side view of the optical component of FIG. 1 across the sample region.
Figure 4C:
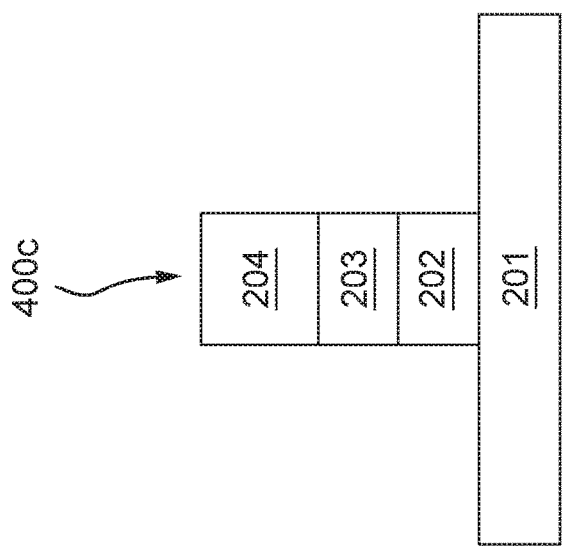
Figure 4B:
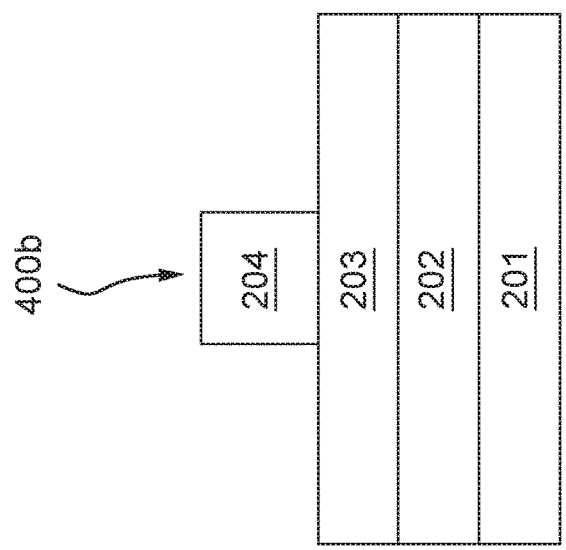
Figure 4A:
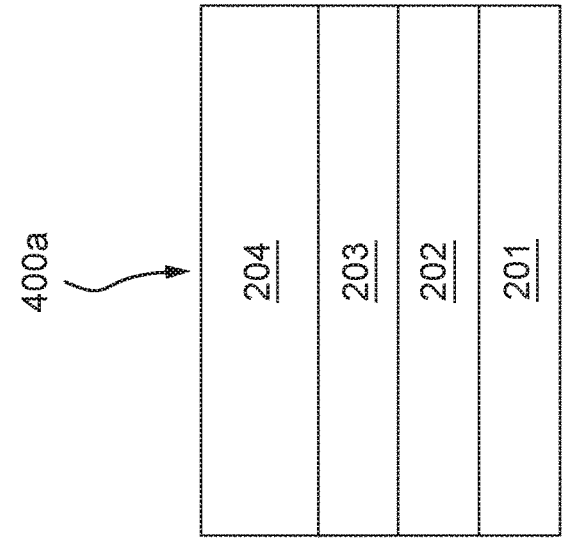

The waveguides 12, 14, 15 in the optical component are two-dimensional rib waveguides (as illustrated in FIG. 4b) but, as explained further below, the waveguide could instead be a two-dimensional channel waveguide or strip waveguide (e.g. as illustrated in FIG. 4c), or a one-dimensional slab waveguide (e.g. as illustrated in FIG. 4a). How to fabricate such one-dimensional and two-dimensional waveguides structures is known in the art. The layer structure of the waveguides can be seen in FIGS. 1, 3 and 4b. As shown, each of the waveguides 12, 14, 15 is formed on a substrate 201 and comprises an optical guiding layer 203 (sometimes as referred to herein as a core layer 203) sandwiched between an upper cladding layer 204 and a lower cladding layer 202. The lower cladding layer 202 is arranged between the substrate 201 and a first face 208 of the core layer 203. The upper cladding layer 204 is arranged on a second face 209 of the core layer 203 which is opposite to the first face 208 of the core layer 203. The core layer 203 has a higher refractive index than the cladding layers 202, 204 and guides input light along the waveguide 12, 14, 15 using total internal reflection.

Figure 4D:
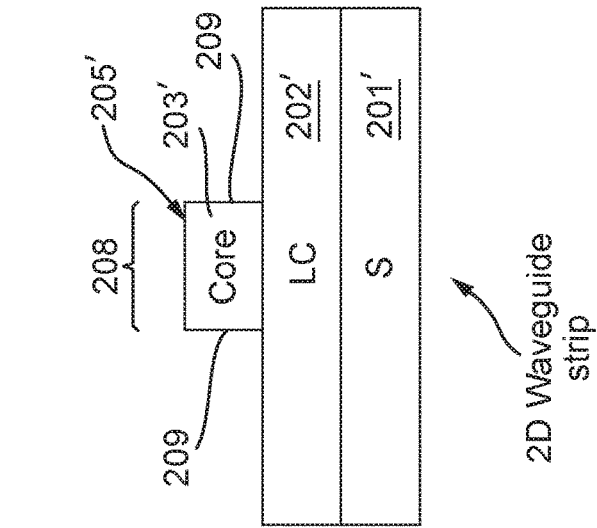
Figure 4E:
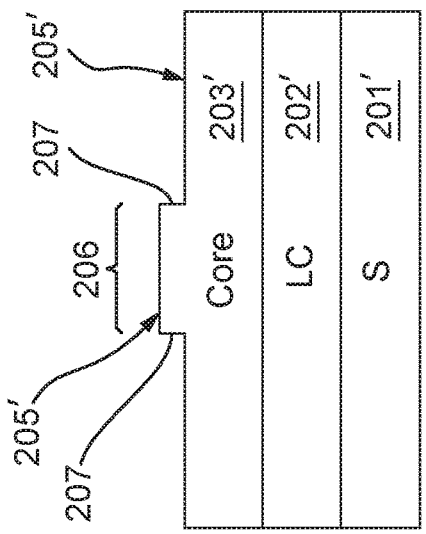
Figure 4F:
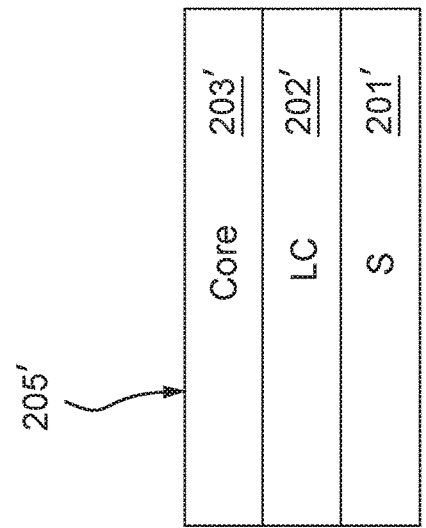

In some embodiments, a one-dimensional or a two-dimensional waveguide may be formed by using a fluid such as air or water as an upper cladding layer. FIGS. 4d-4f illustrate such alternative forms of waveguide. Specifically, FIG. 4d illustrates a one-dimensional slab waveguide, FIG. 4e illustrates a two-dimensional dimensional rib waveguide, and FIG. 4f illustrates a two-dimensional channel strip waveguide. Each of these waveguides respectively comprises a lower cladding layer 202' arranged on a substrate 201', and a core layer 203' arranged on the lower cladding layer 202'. The upper surface 205' of the core layer 203' in each waveguide is exposed to a fluid such as air or water. The width of the core layer in the slab waveguide (FIG. 4d) may be 100 µm to 500 µm, or 100 µm to 150 µm, or 100 µm to 200 µm, or 100 µm to 300 µm, or 100 µm to 400 µm, or wider.

The upper surface 205' of the core layer 203' of the rib waveguide of FIG. 4e is shaped (e.g. using a suitable etching process such as reactive ion etching or wet-etching) to define a ridge 206 that protrudes from the bulk of the core layer 203'. The sidewalls 207 of the ridge 206 rise from the core layer 203'.

The core layer 203' of the strip waveguide of FIG. 4f is entirely formed (e.g. using a suitable etching process such as reactive ion etching or wet-etching) as a ridge 208, sitting on top of a wider lower cladding layer 202'. The sidewalls 209 of the ridge 208 extend the full height of the core layer 203'.

It will be appreciated that the ridges 206, 208 in the rib-waveguide and the strip waveguide provide a lateral refractive index contrast with the surrounding fluid medium. This lateral refractive index contrast is used to guide light in the lateral plane (i.e. in a plane parallel to the plane of the substrate 201').

The width, $r_w$, of the ridge 206 in a rib waveguide and the width of the ridge 207 in a strip waveguide may be: 1 µm≤$r_w$≤100 µm; or 1 µm≤$r_w$≥10 µm; or 10 µm≤$r_w$≤30 µm; or 10 µm≤$r_w$≥50 µm; or 10 µm≤$r_w$<100 µm, although they may be wider than this. For instance, the ridges 206, 207 may be 25 to 500 µm wide, and 150 to 220 nm thick.

In alternative arrangements, the rib waveguide of FIG. 4e or the strip waveguide of FIG. 4f may comprise a solid upper cladding layer 204' as illustrated in FIG. 4g and FIG. 4h, respectively. In FIG. 4g, a solid upper cladding layer 204' covers the ridge 206 of the rib waveguide. In FIG. 4h, a solid upper cladding layer 204' covers the ridge 208 of the strip waveguide.

It will be appreciated that each of the one-dimensional waveguides described herein may be a one-dimensional slab waveguide in accordance with any of the waveguides illustrated in FIGS. 4a and 4d. Each of the two-dimensional waveguides described herein may be a two-dimensional rib or strip waveguide in accordance with any of the waveguides illustrated in FIG. 4b, 4c, 4e, 4f or 4g.

It will be appreciated that rib waveguides and other such two-dimensional waveguides confine the optical field of the guided input light in the transverse direction (i.e. normal direction to the core layer) and the lateral direction (i.e. in a direction across the plane of the core layer). In contrast, one-dimensional waveguides confine the optical field of the guided input light only in the transverse direction (i.e. normal direction to the core layer).

It will also be appreciated that in any of the waveguides (i.e. one-dimensional or two-dimensional) a portion of the input light being guided therein travels outside of the waveguide core region 203. This portion of light is known in the art as an evanescent field. Typically, the evanescent field will propagate in the upper and lower cladding layers.

In this example, and as best seen in the side view of the sample region 55 in FIG. 3, the sample region 55 is in the form of a sample well. The sample well 55 resides where waveguide 14 meets waveguide 15 and is defined by a well through the upper cladding layer 204 of the waveguides 14, 15. A result of positioning the sample well 55 in this region is that only the evanescent light propagating in the upper cladding layer 204 of the waveguides 14, 15 (and not the light propagating in core layer 203) is directed into the sample well 55 from each waveguide 14, 15. Accordingly, in this example, it will be appreciated that the periodic light patterns (e.g. 510 in FIG. 5) that are generated within the sample well 55 (i.e. sample region 55) is caused by the interference of evanescent light directed into the sample well from waveguides 14 and 15. Light directed into the sample region 55 is referred to herein as excitation light and the generated periodic light patterns are referred to as illumination patterns or excitation patterns. The face of a waveguide from which excitation light is directed into the sample 50 is referred to herein as an output face.

The imaging unit 60 includes a fluorescence detection device 62 for detecting light from the sample 50, such as a CCD or sCMOS sensor and an electronic control unit 64 to control the fluorescence detection device 62 and the light-injecting device 40, and to process the detected light to produce a SIM image of the sample 50 using known SIM imaging techniques.

The waveguide 14 also comprises an active phase adjuster 18 (see, FIG. 2) such as a thermal phase adjustor, opto-fluidic or an electro-optic phase adjustor. The phase adjustor 18 adjusts the refractive index of the waveguide 14 to shift the phase of the light beam in the sample region 55 from waveguide 14 relative to the phase of the light beam in the sample region 55 from waveguide 16. Changing the relative phase difference between these interfering light beams shifts the position of the fringes in the resulting interference pattern axially relative to the sample region 55. Optionally, waveguide 16 may also comprise a phase adjustor.

The imaging unit 60 controls the fringe shift by, for example, adjusting the current and/or voltage provided to the phase adjuster 18.

As an example, to take a SIM image of a sample within the sample region, the light-injecting device 40 injects input light into the input waveguide 12 of the input interface 11. The input waveguide 12 directs the input light to the optical splitter 13 which then splits the input light into first and second input light. The first input light is received by the first waveguide 14 from the first output of the optical splitter 13, and the second input light is received by the second waveguide 15 from the second output of the optical splitter 13. The first and the second waveguides 14, 15 curve towards the sample region so as to respectively direct first input light into the sample region 55 along a first direction 14x, and direct second input light into the sample region 55 along a second direction 15x. The first direction 14x and the second direction 15x tend towards each other so as to generate a first periodic light pattern for exciting the sample 50. Preferably, the first and second directions 14a, 15x are parallel and opposite. The fluorescent light pattern emitted from the sample 50 as a result of the first periodic light pattern 510 (i.e. first excitation pattern) is recorded and processed by the imaging unit 60, as explained below.

After exciting the sample 50 with the first periodic light pattern (i.e. first excitation pattern), the imaging unit 60 adjusts the phase of the phase adjustor 18 so as to shift the fringes of the first periodic light pattern by another phase shift (e.g. $2\pi/3$) along axis 55x. The shifted periodic light pattern forms a second periodic light pattern (i.e. second excitation pattern). Of course, in other embodiments the second periodic light pattern may be formed by shifting the fringes by any amount between 0 and $2\pi$.

Next, the fringes are further shifted by $2\pi/5$ (or alternatively any amount) along axis 55x so as to form and illuminate the sample with a third periodic light pattern (i.e. third excitation pattern).

The fringes may of course be shifted a further number of times to illuminate the sample with a further number of excitation patterns.

Each excitation pattern will cause fluorophores in the sample 50 to fluoresce and emit light. The objective lens 30 collects the light emitted from the fluorophores for each excitation pattern. The light collected by the objective lens 30 is directed to the fluorescence detection device 62. The fluorescence detection device 62 detects the received light as electrical signals and transmits the electrical signals to the electronic control unit 64 for each excitation pattern. The electronic control unit 64 processes the electrical signals associated with all of the excitation patterns using known SIM processing methods to produce an image of the sample.

The electronic control unit 64 may comprise any suitable processing means, such as one or more of microprocessors, microcontrollers, ASICs, FPGAs, DSPs, memory and memory containing software instructions; it may comprise a single device, such as a desktop PC, or it may distributed such as a remote server or a cloud of servers.

Optionally, the imaging unit 60 may also include one or more filters such as a band filter to filter the light collected by the objective lens 4. For example, the filter may be configured to block light corresponding to the excitation light and transmit light corresponding to the light emitted by the fluorophores.

It will be appreciated that in the above example, and other embodiments described herein, a periodic light pattern (i.e. excitation pattern) is generated by receiving light from the light-injecting device 40 at one face of the optical component 10. This results in a simpler and more compact arrangement for illuminating the sample 50 with a periodic light pattern than conventional set-ups because, for example, additional opto-mechanical components are not required for directing two counter propagating beams of light within the sample region 55 from two different faces of the optical component 10. Further, opto-mechanical components such as a movable mirror are not required to shift the fringes of an interference pattern relative to the sample.

In rib waveguides, it will be appreciated that transverse optical guiding (i.e. in the direction normal to the plane of the layers) is provided by the refractive index contrast between the core layer 203 and the cladding layers 202, 204. Lateral optical guiding is provided by having a ridge extending part way through the upper cladding layer 204, but not through the core layer 203 of the waveguide. The lateral optical guiding in the ridge waveguide 400b structure increases the intensity of the evanescent light (i.e. evanescent field) propagating outside of the core layer 203. Accordingly, compared with using a conventional slab waveguide structure 400a (which does not have a ridge) the intensity of the evanescent light overlapping the sample region 55 is increased. Thus, by using a rib waveguide structure, the intensity of the excitation light interacting with the sample 50 is increased and thereby stronger fluorescence is produced. Another benefit of using rib waveguides compared with slab waveguides (which only provide transverse optical guiding) is that they allow sharper bends and turns with less light leakage. In this way, sharper bends and turns in the waveguide can be used to provide a more compact optical component 10 with a reduced footprint. In particular, sharper bends and turns in the waveguide can be used to direct input light from one side of the optical component (e.g. from the input interface) to different sides of the sample region 55 and along different directions within the sample region 55 to generate different periodic light patterns.

To further reduce bend losses in the waveguide, and thereby enable even sharper bends and turns for making the optical component even more compact, the waveguides in the embodiments herein may be in the form of strip waveguides. As illustrated in FIG. 4c, strip waveguides 400C also have a ridge that provides lateral optical guiding. However, unlike in rib waveguides, the ridge extends through the upper cladding layer 204 and through (or at least part way through) the core layer 203 of the waveguide. A further benefit of using strip waveguides 400C is that they increase the intensity of the evanescent field propagating outside of the core layer. Accordingly, in embodiments where only the evanescent field is directed into the sample region, the intensity of the periodic light pattern illuminating the sample may be increased by using a strip waveguide 400c to direct light into the sample region. Thus, for example, waveguides 14 and 15 in FIG. 2 may be strip waveguides.

In alternative embodiments, the waveguides in the present example may be slab waveguides, particularly in cases where high power and sharp bends/turns are not required. It will also be appreciated that slab waveguides may in some cases be preferable because they are easier and cheaper to fabricate and may involve fewer or no photo-lithography steps as compared with rib and slab waveguides.

Generally, for the wavelength ranges and waveguides described herein, the lateral optical guiding may be negligible for ridge widths beyond 20 microns.

In embodiments herein, the rib, strip and slab waveguides are preferably formed on a silicon or transparent substrate 201 and comprise a thin core layer 203 (preferably less than 500 nm and ideally 100-200 nm) of tantalum pentoxide Ta2O5 or silicon nitride Si3N4, a lower cladding layer 202 of silicon dioxide SiO2, and an upper cladding layer 204 of silicon dioxide SiO2. The upper 204 and lower 202 cladding may alternatively be made of material having a refractive index that matches closely to the refractive index of the sample 50 (e.g. n=1.38). However, in other embodiments, the substrate of the optical component may be made of glass. Additionally or alternatively, the upper cladding layer of the waveguides may be air. In embodiments, wherein the upper cladding layer of the waveguides is air, the sample may be illuminated with an excitation pattern formed by interfering evanescent light beams by placing it directly onto the top of the waveguides in the region where they meet to interfere their respective light beams. In this case, the sample region is the region where the sample is illuminated by interfering light beams and the sample region may not comprise a sample well.

The ridges of the rib waveguides 200b and the strip waveguides 200C may be defined by a suitable etching process. For example, ion-beam milling or reactive ion etching may be used to etch the upper cladding layer 204 to define a ridge. The upper cladding layer 204 is preferably etched to a depth of 200 nm above the core layer 203. Ion-beam milling has been found to advantageously reduce the sidewall roughness of the waveguide. In this way, the optical propagation losses within a waveguide structure may be reduced.

In embodiments herein, the direction of one or more of the interfering beams within the sample region may be angularly offset relative to the direction of another interfering beam within the sample region. The angular offset may be between the range 0 and 180 degrees. For example, with reference to FIG. 2, the waveguide 16 may curve towards, and optically couple with a non-opposing side of the sample region (e.g. side 55c in FIG. 2) so as to direct input light into the sample region 55 (i.e. sample well) at an angle between 0 and 180 degrees relative to the first direction 14x. As a further example, the sample region 55 may be coupled directly to the second output of the optical splitter 13 so as to direct second input light into the sample region 55 from side 55c along a direction that is angularly offset relative to the first direction 14x.

In the embodiments herein, the phase adjustors are preferably an active phase adjuster such as a thermal phase adjustor or an electro-optic phase adjustor. However, in alternative embodiments, the phase adjustors may be a passive phase adjustor. A passive phase adjustor may be for example a fillable gap in the upper cladding layer of a respective waveguide to which the phase adjustor is coupled to, wherein selectively filling the gap with different refractive index materials (e.g. Silicon dioxide, PMMA, or SU8) changes the effective refractive index of the waveguide.

Optionally, the light-injecting device in embodiments herein may comprise an optical fibre that directs light from the light source into the input interface of the optical component. Further optionally, the lens may couple light from the optical fibre into the input interface.

Further optionally, an optical multiplexer such as an optical switch may be arranged to selectively direct the light from the light source along one or more different paths, wherein each path is injected into one or more different inputs of the input interface by the lens and/or an optical fibre. In other embodiments, the light-injecting device may inject input light having one or more different wavelengths into the input interface of an optical component. The different wavelengths of the input light may be generated by a tunable laser, or a set of light sources comprising a light source for each wavelength. The wavelength, or wavelengths, of the input light are selected so as to cause the light emitting markers to emit light, e.g. the wavelength(s) of the input light may be in the visible spectrum (400 to 800 nanometres) or near-IR (800 to 1500 nanometres). Further, each light source may be a laser light source such as a solid state laser, fibre laser or diode laser. Additionally or alternatively, each light source may be a LED light source or any other light source suitable for SIM. Examples of such alternative light-injection device arrangements are illustrated in FIGS. 7, 9, 10 and 13.

Optionally, the waveguide(s), the optical splitter(s), the phase adjustors and the sample region 55 of the embodiments herein may be monolithically integrated on the substrate 201 of the optical component 10.

Optionally, the waveguides may comprise a flared end region 15, 17, as exemplified in FIG. 2. The flared end region 15, 17 widens along its length to increase the width of a sample well 55. Increasing the width of the waveguide broadens the width of the optical light field propagating along the waveguide and allows for a larger sample well 55 for holding a sample 50. A larger sample well 55 combined with a wider excitation light field advantageously allows a larger sample area to be imaged for SIM imaging.

The sample well 55 may be formed by using photolithography and etching techniques (e.g. wet etching or ion-beam milling) to define a gap in the upper cladding layer 204 of the respective waveguides. For example, the wet-etching may be used to define a sample well 55 in the ridge of the rib waveguide 400b or strip waveguide 400c.

In the embodiments herein, the sample well 55 may be defined in the upper cladding layer 204 of one waveguide only (e.g. waveguide 14).

Before placing the sample into the sample region, the optical component may be cleaned by submerging the optical component 10 in 5% (v/v) Hellmanex™ (from Sigma Aldrich™) for 10 minutes at 70° C. Subsequently, the Hellmanex™ may be removed by firstly submerging it in deionized water, secondly in isopropanol (from Sigma Aldrich™), and thirdly in deionized water.

The sample well in the embodiments described herein may contain a bio layer 205 arranged on the waveguide core layer 203 as illustrated in FIG. 3. The bio layer prevents non-specific binding of fluorophores in the sample to the waveguide core layer 203 and may comprise BSA or PEG. In addition, the bio layer 205 facilitates cultivation of a sample directly within the sample well. The bio layer 205 is preferred but not mandatory. Also, the thickness of the bio layer 205 is selected so as to ensure that the periodic light pattern generated by the interfering evanescent fields still overlaps with the sample in the sample well and is typically less than 20 nm.

Optionally, samples can be prepared directly in the sample well following standard protocols such as, for example, known protocols used for cell attachment to glass coverslips.

Figure 6:
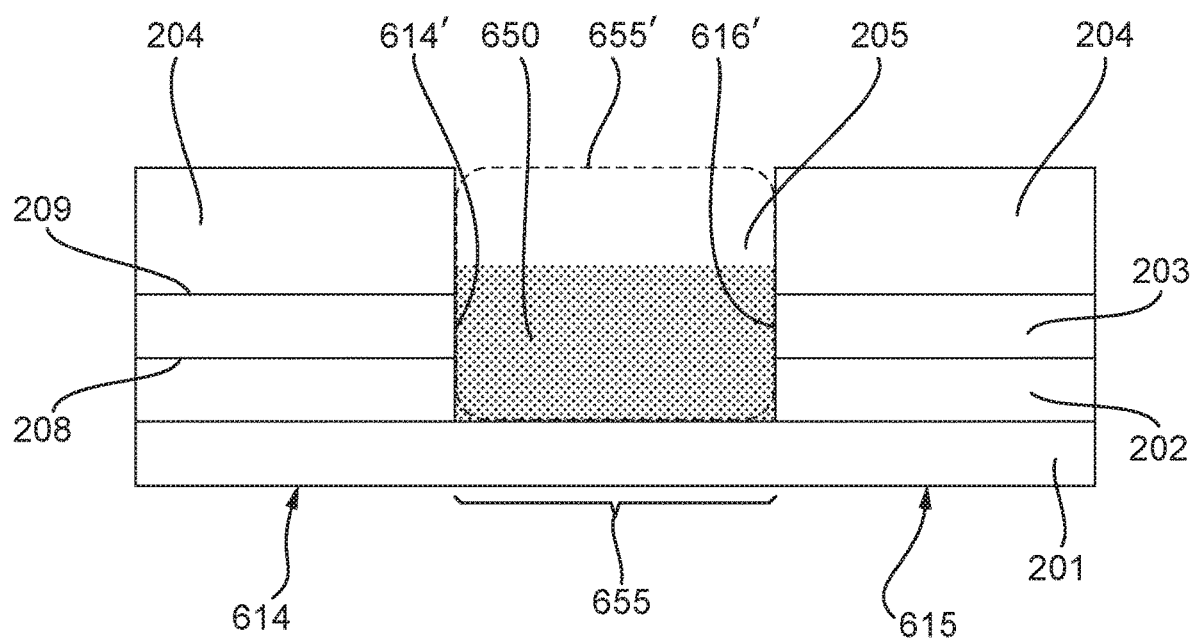
FIG. 6 is a side view of an optical component according to the present invention.

FIG. 6 illustrates an alternative arrangement wherein the end facets 614', 616' of the first and second waveguides 614, 616 define the sample well 655 (i.e. sample region 655). The sample well 655 may be defined by terminating each waveguide down to, or through the substrate layer 201. Typically, the waveguide may be terminated by etching or cleaving the waveguide. It will be appreciated that the term end facet herein has its usual meaning in the art and, accordingly, is the output face of the waveguide from which substantially the entire guided optical mode in the core layer is outputted. In the example illustrated in FIG. 3, it will be appreciated that the waveguides 14 and 15 do not have an end facet as the waveguides join to form a continuous core layer 203 beneath the sample well 55.

In the example illustrated in FIG. 6, the first input light guided along waveguide 614 is directed from the waveguide's end facet 614' into the sample well 655. Similarly, the second input light guided along waveguide 616 is directed from the waveguide's end facet 616' into the sample well 655 along a second direction. Since the second direction tends towards the first direction, the first light beam from waveguide 614 interferes with the second light beam from the waveguide 616 to form a periodic interference pattern for illuminating the sample.

FIGS. 7-10 illustrate embodiments wherein the optical component comprises additional waveguides and, in some cases additional optical splitters, to direct input light into a sample region along different directions. As described below, the multiple input directions enable the optical component to rotate a given periodic light pattern relative to an axis of the sample region (i.e. to change the orientation of an excitation pattern relative to the sample). In addition, the multiple input directions enable periodic interference patterns to be generated with more than two input light beams. Further, it enables light beams to be directed into the sample region along directions which are not parallel with the direction of another light beam. In this way, the optical components of the present invention are not limited to interfering only counter propagating beams of light within the sample region.

Figure 7:
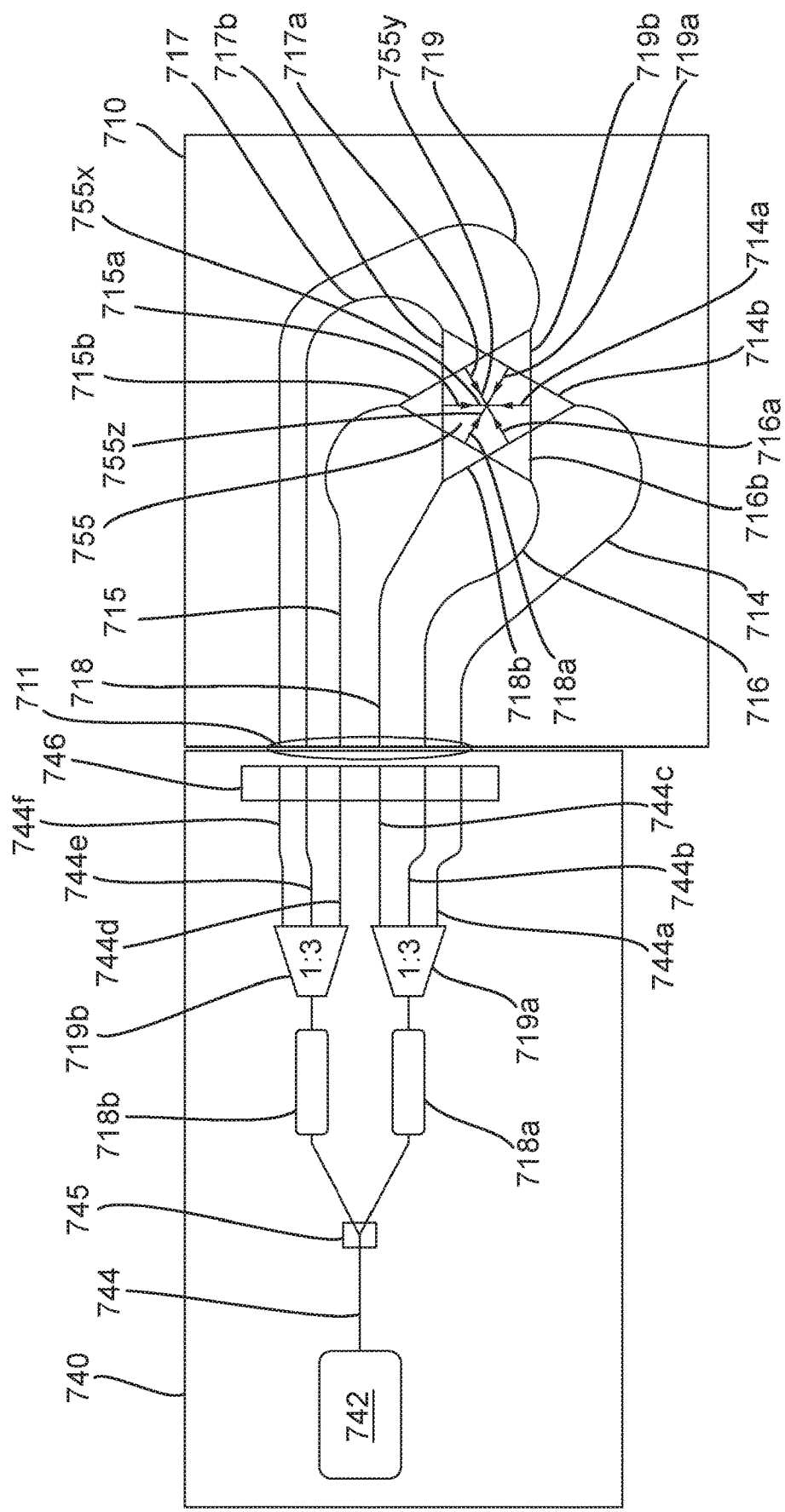
FIG. 7 is a planar view of a light injecting arrangement and an optical component according to the present invention.

FIG. 7 illustrates an optical component 710 comprising six waveguides 714-719, which are preferably two-dimensional rib waveguides 400b. The waveguides 714-719 are not connected to each other and terminate at a common face of the optical component 710. The terminated end portions are optically coupled to the light-injecting device 740 and accordingly define an input interface 711 of the optical component 710. Each of the waveguides curve towards, and are optically coupled to, different sides of the sample region so as to direct input light from the light injecting device 740 into the sample region 755 along six different directions 714a-719a.

Specifically, waveguides 714 and 715 are arranged to direct input light into the sample region 755 along directions 714a and 715a, respectively. Directions 714a and 715a are opposing directions along a first axis 755x of the sample region 755. Waveguides 716 and 717 are arranged to direct input light into the sample region 755 along directions 716a and 717a, respectively. Directions 716a and 717a are opposing directions along a second axis 755y of the sample region 755. The second axis 755y is 60 degrees angularly offset from the first axis 755x, and accordingly directions 716a and 717a are 60 degrees offset from directions 714a and 715a. Waveguides 718 and 719 are arranged to direct input light into the sample region 755 along directions 718a and 719a, respectively. Directions 718a and 719a are opposing directions and along a third axis 755z of the sample region 755. The second axis 755y is 60 degrees angularly offset from the first axis 755x and the second axis 755y. Accordingly, directions 718a and 719a are 60 degrees offset from directions 714a and 715a, and 60 degrees offset from directions 716a and 717a.

To illuminate a larger area of the sample region 755, each waveguide 714-719 preferably comprises a flared end region 714b-719b to expand the optical field of its respective input light before it is directed into the sample region 755.

The light-injecting device 740 comprises a light source 742 (e.g. a visible or near-IR laser light source), a beam splitter 745, two amplitude modulators 718a, 718b, two optical multiplexers 719a, 719b, and a lens 746. The light-injecting device 740 generates six possible light beams 744a-744f which are each optically coupled into a respective waveguide 714-719 by the lens 746. The six possible beams of light are generated in the following way. First, the light from the laser 742 is split into two beams using a beam splitter 745. The two light beams are then directed to a respective amplitude adjustor 718a, 718b before being sent to a respective optical multiplexer 719a, 719b. The amplitude adjustor 719a, 719b controls the visibility of the interference fringes in the periodic light pattern by adjusting the amplitude of the light being injected into the waveguides 714-719. The optical multiplexers 719a, 719b are preferably of the type used in telecommunication networks (e.g. 40G optical switches) and are set to selectively output any one of, or combination of, light beams 744a, 744b, 744c, 744d, 744e, and 744f. By controlling which beams of light to output, the optical multiplexers 719a, 719b selectively control which of one of the waveguides 714-719, or which combination of waveguides 714-179, input light is injected.

It will be appreciated that in this example, light may be injected into any two or more of the waveguides 714-719 to generate a periodic light pattern. Further, different periodic light patterns for illuminating the sample may be generated by injecting light into different combinations of waveguides (e.g. using waveguides 714, 715, and 718 to direct light into the sample region 755 along directions 714a, 715a, and 718a, respectively). Further, it will be appreciated that the orientation of the fringes in a given periodic light pattern may be rotated relative to the sample region by selectively directing light into the sample region 755 from appropriate combinations of waveguides. For example, as shown in FIG. 8, a "grating like" periodic light pattern 800a-800c (which is generated by directing two counter propagating light beams into the sample region 755 from opposing waveguides, e.g. 714 and 715) may be generated in different orientations relative to the sample region 755 by directing light into the waveguide region 755 from different pairs of opposing waveguides (e.g. 714 and 715, 716 and 717, and 718 and 719).

To obtain a SIM image of a sample residing within the sample region 755 using the "grating like" periodic light pattern 800a-800c shown FIG. 8, the following steps may be taken.

First, input light is injected into waveguides 714 and 715 so as to direct counter propagating light beams along axis 755x in the sample region. The interference of the two counter propagating beams generates a first periodic light pattern 800b for exciting the sample. The fluorescent light pattern emitted from the sample as a result of the first periodic light pattern 800b (i.e. first excitation pattern) is collected by an objective lens 30, and recorded and processed by a imaging unit 60, as per the aforementioned embodiments.

Next, to change the orientation of the first periodic light pattern relative to the sample region 755, the optical multiplexer is set to inject input light into waveguides 716 and 717 so as to direct counter propagating light beams along axis 755y in the sample region 755. The resulting interference pattern forms a second periodic light pattern (i.e. second excitation pattern). The fluorescent light pattern emitted from the sample as a result of the second periodic light pattern 800b is collected by the objective lens 30, and recorded and processed by an imaging unit 60.

Subsequently, to further change the orientation of the first periodic light pattern relative to the sample region 755, the optical multiplexer is set to inject input light into waveguides 718 and 719 so as to direct counter propagating light beams along axis 755z in the sample region 755. The resulting interference pattern forms a third periodic light pattern (i.e. third excitation pattern). The fluorescent light pattern emitted from the sample as a result of the third periodic light pattern 800c is collected by the objective lens 30, and recorded and processed by a imaging unit 60.

The orientation of first periodic light pattern may of course be changed a further number of times to illuminate the sample with a further number of excitation patterns. It will be understood that, in some examples, the wavelength of the input light might vary between the different orientations so that the patterns don't necessarily all have the same period.

Finally, as with the previous embodiments, the electronic control unit 64 of the imaging unit 60 processes the electrical signals associated with all of the excitation patterns using known SIM processing methods to produce a SIM image of the sample.

Preferably, the opposing waveguide pairs (e.g. 714 and 715) may each comprise a phase adjustor coupled to one of the waveguides (e.g. 714). The phase adjustor may be used to shift the fringe spacing of the periodic light patterns for each orientation to generate further excitation patterns. The imaging unit 60 may use the emission patterns resulting from these further excitation patterns to generate a SIM image.

Optionally, the amplitude adjustors (e.g. variable light absorbers) may be adjusted to increase the contrast between the interference fringes in the various period light patterns (i.e. excitation patterns).

FIG. 9 shows an example of an arrangement wherein the number of inputs at the input interface 911 is reduced by using optical splitters 913a-913c to couple input light from the light-injecting device 940 into one or more waveguides 914-919 for directing input light into the sample region 955 along one or more different directions 914a-919a.

As shown, the input interface 911 of the optical component 910 comprises three y-branch optical splitters 913a-913c. The input of each optical splitter 913a-913c terminates at the left face of the optical component 910 and is arranged to receive input light injected into the optical component 940 from the light-injecting device 940. The two outputs of each optical splitter 913a-913c are each optically coupled to a respective waveguide 914-919. The waveguides 914-919 are preferably rib waveguides and each waveguides curves towards, and is optically coupled to, different sides of the sample region 955 so as to direct input light from the light injecting device 940 into the sample region 955 along six different directions 914a-919a.

Specifically, waveguides 914 and 915 are arranged to direct input light into the sample region 955 along directions 914a and 915a, respectively. Directions 914a and 915a are opposing directions along a first axis 955x of the sample region 955. Waveguides 916 and 917 are arranged to direct input light into the sample region 955 along directions 916a and 917a, respectively. Directions 916a and 917a are opposing directions along a second axis 955y of the sample region 955. The second axis 955y is 60 degrees angularly offset from the first axis 955x. Accordingly, it will be appreciated that directions 916a and 917a are 60 degrees offset from directions 914a and 915a. Waveguides 918 and 919 are arranged to direct input light into the sample region 955 along directions 918a and 919a, respectively. Directions 918a and 919a are opposing directions along a third axis 955z of the sample region 955. The second axis 955y is 60 degrees angularly offset from the first axis 955x and the second axis 955y. Accordingly, directions 918a and 919a are 60 degrees offset from directions 914a and 915a, and 60 degrees offset from directions 916a and 917a.

To illuminate a larger area of the sample region 955, each waveguide 914-919 preferably comprises a flared end region to expand the optical field of its respective input light before it is directed into the sample region 955.

The light-injecting device 940 comprises a light source 942 (e.g. a visible or near-IR laser light source), an optical fibre 944, an optical multiplexer 919, and a lens 946. The light from the light source 942 is directed into the optical multiplexer 919 by the optical fibre 942. As in the other embodiments herein, the optical multiplexer 919 is preferably of the type used in telecommunication networks and it is arranged to control which waveguide, or waveguides, input light is injected. Preferably, the optical multiplexer is optimised for the wavelengths disclosed herein—e.g. visible wavelengths in the region of 400-700 nm.

In this example, it will be appreciated that injecting input light into optical splitter 913a will result in counter propagating light beams being injected into the sample region 955 along axis 955x from waveguide pair 914 and 915. Input light from these waveguides 914, 915 will travel into the sample region 955 along directions 914a and 915a, respectively, and interfere to generate a first periodic light pattern 800b. Input light injected into optical splitter 913b will result in input light being injected into the sample region 955 along directions 916a and 917b by waveguide pair 916 and 917. Input light traveling within the sample region 955 along directions 916a and 917b will interfere to generate a second periodic light pattern 800c. A third periodic light pattern may be generated by injecting input light into optical splitter 913c so as to direct input light into the sample region 955 along directions 918a and 919a using waveguides 918 and 919.

Thus, it will be appreciated that input light may be injected into any two or more of the optical splitters to generate different periodic light patterns. Further, the orientation of the periodic light pattern may be rotated relative to the sample region by changing which optical splitter to inject input light.

Accordingly, for example, to obtain a SIM image of a sample with this arrangement, the light-injecting device 940 may sequentially illuminate a sample within the sample region 955 with the first, the second, and the third periodic light patterns by sequentially injecting input light into optical splitters 913a, 913b, and 913c. The light pattern emitted from the sample as a result of the different periodic light patterns may be collected by a lens and processed by an imaging unit 60 to generate a SIM image of the sample using known SIM processing techniques, as per the other embodiments herein.

Preferably, the waveguides 914-919 may each comprise a phase adjustor 918a-918c, 918a'-918c'. As with previous embodiments, the phase adjustor may be used to shift the fringe spacing of the periodic light patterns for each orientation to generate further excitation patterns. The imaging unit 60 may use the emission patterns resulting from these further excitation patterns to generate a SIM image.

In the above arrangements, it will be appreciated that the orientation and the position of the fringes of the periodic light pattern may be changed relative to the sample region without having to move the light-injecting device and/or the optical component. Further, the light-injecting device 940 injects input light into only one face of the optical component 955, resulting in a more compact SIM imaging set-up compared with conventional set-ups. Further, in embodiments comprising an optical multiplexer, the generation of the first, the second, and the third periodic light patterns is limited only by the speed of the optical multiplexer, rather than the movement of opto-mechanical components (e.g. movable mirror) as in conventional set-ups. This is advantageous as current optical multiplexers, such as those in telecommunications, have modulation speeds of over 1 GHz and this is much faster than current opto-mechanical components which typically have modulation speeds in the KHz range.

In an alternative arrangement, the fringes of a given periodic interference pattern may be axially shifted by shortening or lengthening the optical path length of at least one of the interfering beams. In the above example this is preferably achieved by using a phase adjustor (i.e. 918a-c) such as a thermal phase adjustor. However, in a variant, this is achieved by selectively directing light into a waveguide from two different optical splitters having two different optical path lengths. The different optical path lengths may be achieved by, for example, making the optical splitters out of different refractive index materials or, preferably, by having a longer output length (e.g. longer y-branch output).

Figure 10:
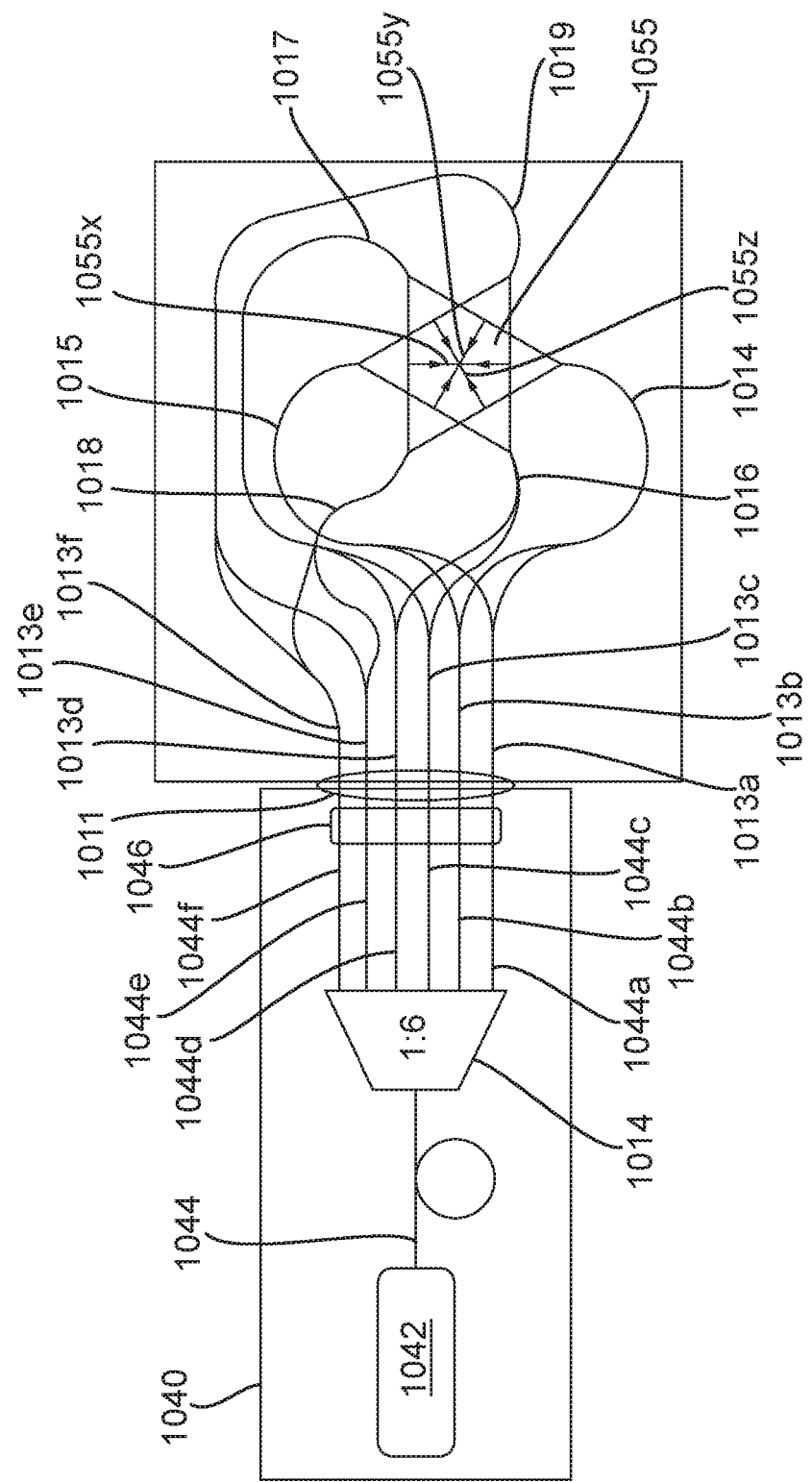
FIG. 10 is a planar view of a light injecting arrangement and an optical component according to the present invention.

FIG. 10 illustrates an arrangement wherein each waveguide 1014-1019 is coupled to receive input light from two different y-branch optical splitters 1013a-1013f. Thus, for example, waveguide 1014 is coupled to one of the outputs of the optical splitter 1013a and to one of the outputs from optical splitter 1013b. Since the output from optical splitter 1013a has a relatively shorter optical path length than the output from optical splitter 1013b, the phase of the light beam (relative to another interfering light beam) directed into the sample region 1055 from waveguide 1014 may be altered depending on whether optical splitter 1013a or optical splitter 1013b is used to inject light into the first waveguide 1014. Selecting which optical splitter 1013a-1013f to use of course depends on which optical splitter 1013a-1013f input light is injected into from the light-injecting device 1040. For example, the light injecting device 1040 may use optical multiplexer 1046 to control which optical splitter 1013a-1013f to inject light from the light source 1042 into.

In this example, each of the waveguides 1014-1019 of the optical component 1055 is arranged to receive input light from an output of two different optical splitters, wherein the outputs have different optical path lengths. Accordingly, the relative phase of the input light being directed into the sample region 1055 from a given waveguide 1014-1019 is adjusted by selecting which optical splitter the waveguide receives input light from.

Thus, for example, to obtain a SIM image of a sample residing within the sample region 1055 input light may be first injected into optical splitter 1013a to illuminate the sample with a first periodic interference pattern. Next, to axially shift the position of the fringes of the first periodic interference pattern (e.g. to linearly shift the fringe by π/3 along axis 1055x of the sample region 1055) input light may be injected into optical splitter 1013b.

To change (e.g. rotate) the orientation of the fringes in the first periodic interference pattern relative to the sample region 1055 (i.e. and thereby illuminate the sample region 1055 with a second period interference pattern) input light may be injected into optical splitter 1013c. The fringes of the second period light pattern may be axially shifted by injecting input light into optical splitter 1013d.

To further change the orientation of the fringes in the first periodic interference pattern relative to the sample region 1055 (and thereby illuminate the sample region 1055 with a third period interference light), input light may be injected into optical splitter 1013e. The fringes of the third period light pattern may be axially displaced by injecting input light into optical splitter 1013f.

As with the other embodiments, the light from the sample in response to the different illuminating periodic light patterns (i.e. the different illumination patterns associated with the different orientations and fringe displacements) may be collected and processed using known SIM processing methods to generate a SIM image of the sample.

Figure 10B:
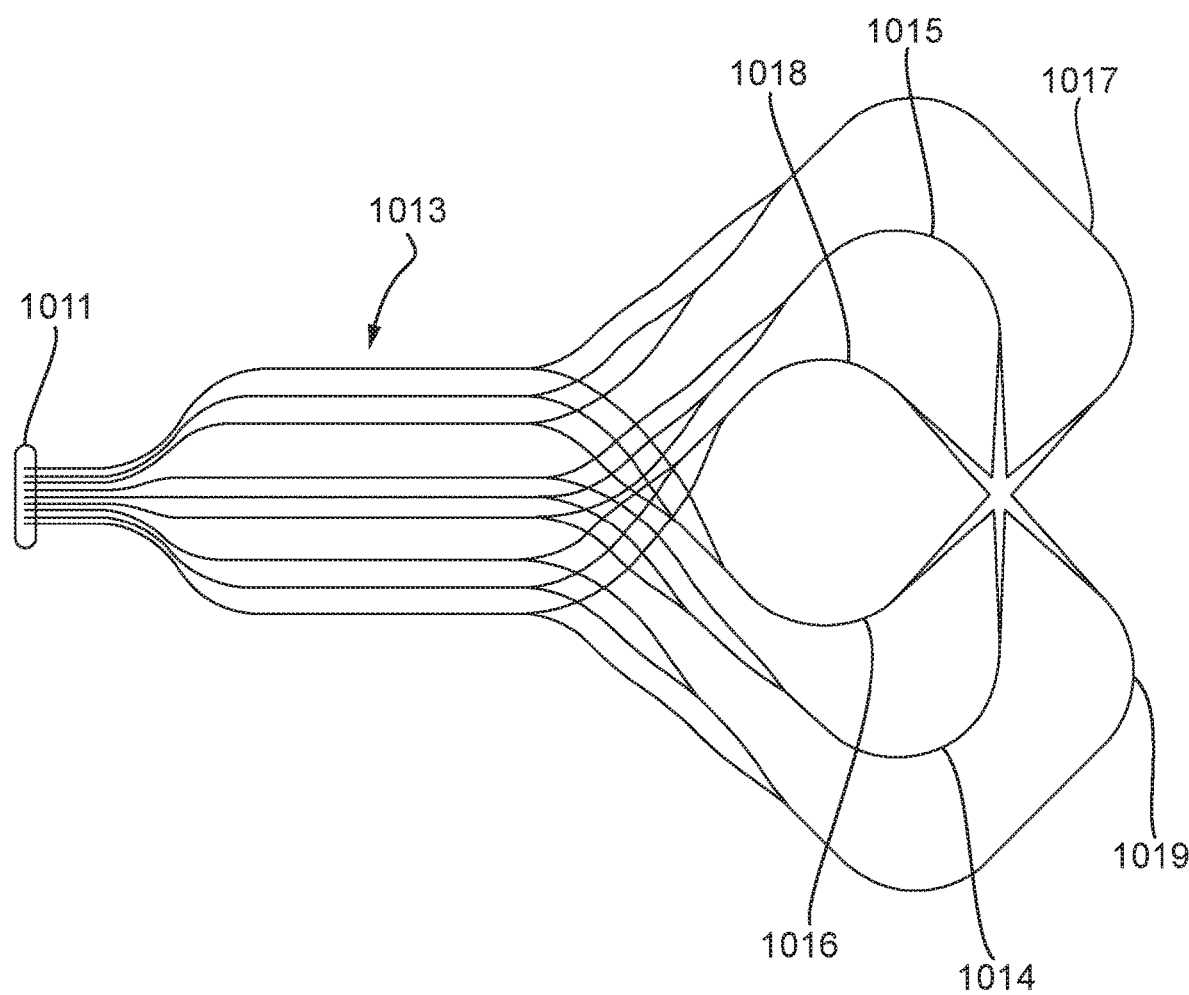
FIG. 10b is a schematic view of a variant light injecting arrangement and an optical component.

In an alternative embodiments, an optical component similar to that illustrated in FIG. 10 may comprise an additional three y-branch optical splitters, making a total of nine y-branch optical splitters, fed from nine respective inputs at the input interface 1011, as shown in FIG. 10b. Each of the six waveguides 1014-1019 is coupled to receive input light from three different y-branch splitters.

In other arrangements, more than three additional y-branch optical splitters may be added to the optical component of FIG. 10. There may, of course, also be more than six waveguides outputting light into the sample region.

Figure 13:
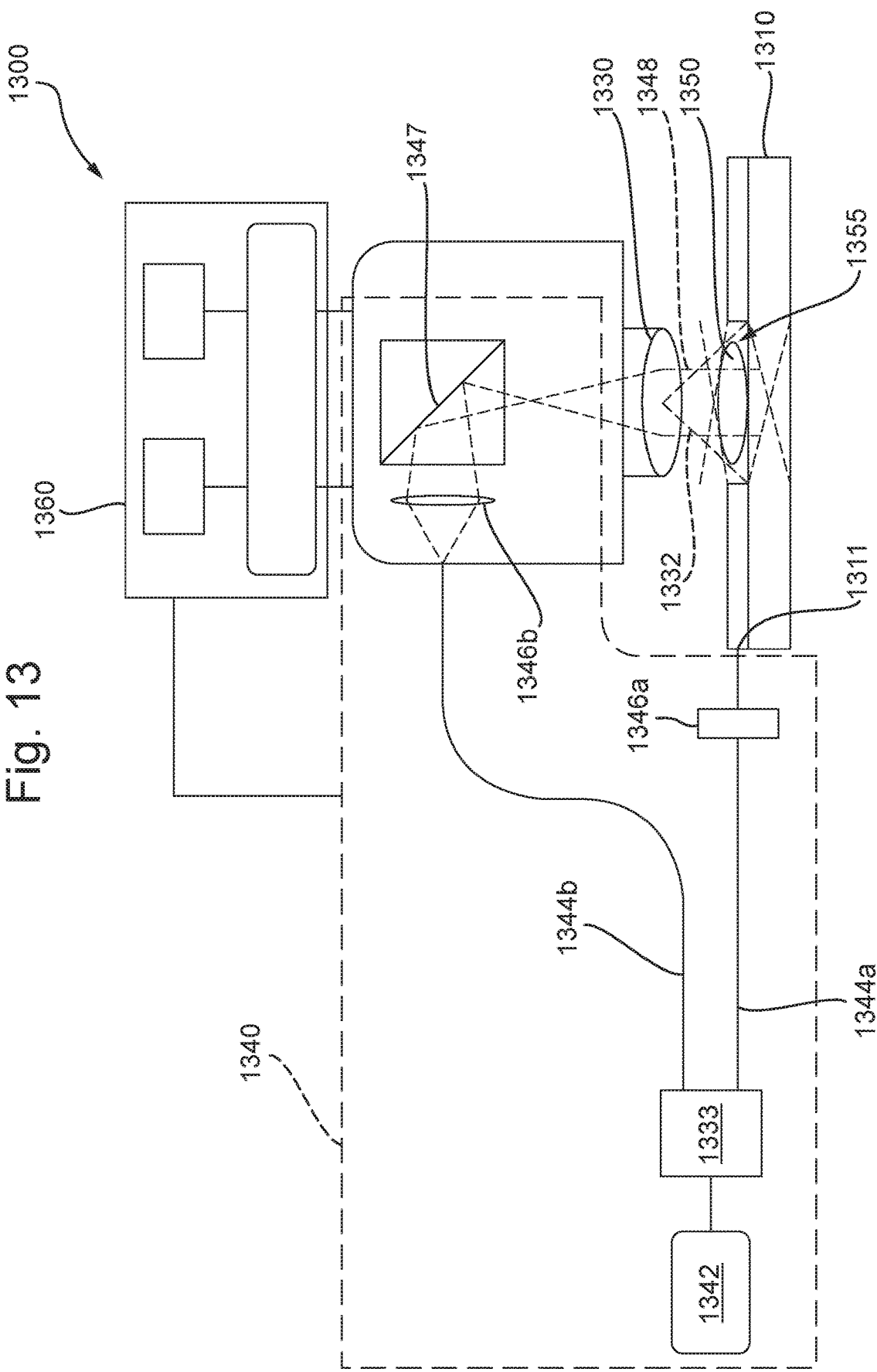
FIG. 13 is schematic of a SIM imaging set-up for 3D SIM imaging comprising an optical component according to the present invention.

To generate 3D SIM images, input light also needs to be directed into the sample region along a direction that is inclined relative to the plane of the core region of the optical component. This may be achieved in the embodiments herein by using a grating and waveguide coupler arrangement as illustrated in FIG. 11, or by directing light into the sample region using an objective lens as illustrated in FIG. 13.

Figure 11:
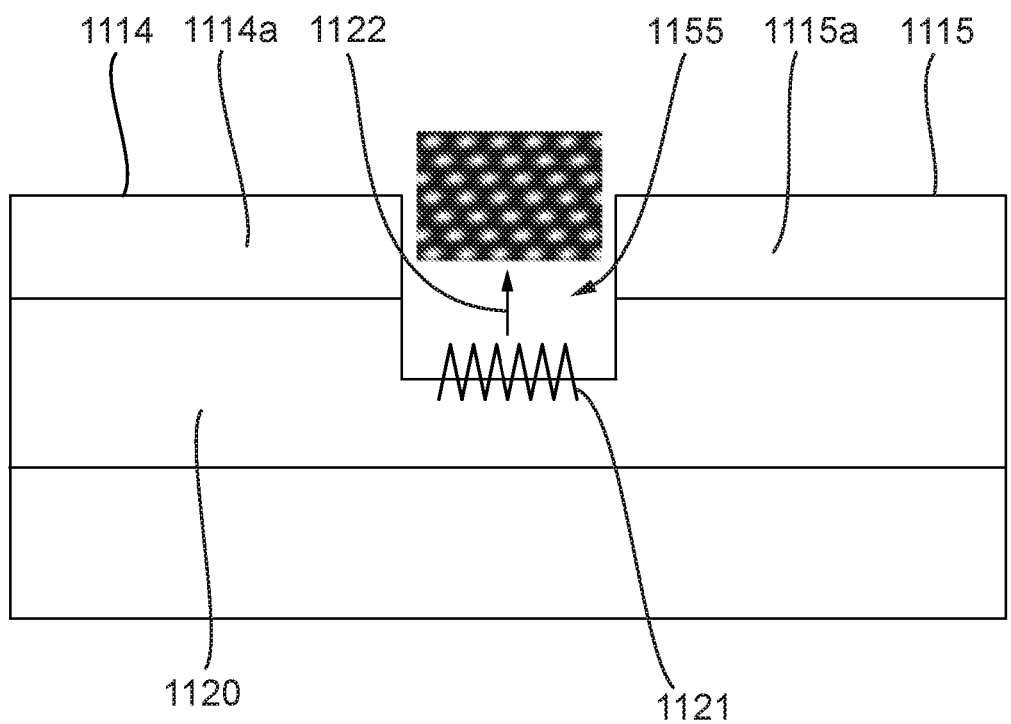
FIG. 11 is a side view of an optical component according to the present invention for generating 3D SIM images.

In FIG. 11 an evanescent waveguide coupler 1120 is placed beneath, and optically coupled, to a waveguide 1114 of the optical component 1155 (e.g. this may be one of the aforementioned waveguides of the optical component or a separate, dedicated waveguide for directing light into the sample region 1155 via the waveguide coupler 1120) so as to receive some of the input light in the waveguide 1114. Preferably, the evanescent waveguide coupler 1120 is arranged between the substrate of the optical component 1155 and the core layer of the waveguide 1114 so as to overlap with the evanescent field of the input light in the waveguide 1114. A result of this overlap is that some of the input light in the waveguide 1114 will be coupled into the evanescent waveguide coupler 1120. The waveguide coupler 1120 is arranged to direct the received light onto a grating 1121 positioned beneath the sample region 1155. Typically, the evanescent waveguide coupler 1120 may comprise a core layer for guiding received light along its length, in the same way as the aforementioned waveguides. The core layer may be sandwiched between an upper cladding layer and a lower cladding layer, and the grating 1121 may be etched into the upper cladding layer so as to overlap with the evanescent field of the guided light in the evanescent waveguide coupler 1120. The grating 1121 may be arranged using known techniques to direct some of the overlapping light towards the above lying sample region 1155. This upwardly directed light 1122 will of course be angled relative to the plane of the sample region 1155. In addition, this upwardly directed light 1122 will also be angled relative to the directions 1114a, 1115a along which input light is injected into the sample region 1155 from the waveguides 1114, 1115. It will be appreciated that the use of "upward" here does not limit these embodiments from being used in other orientations.

Figure 12:
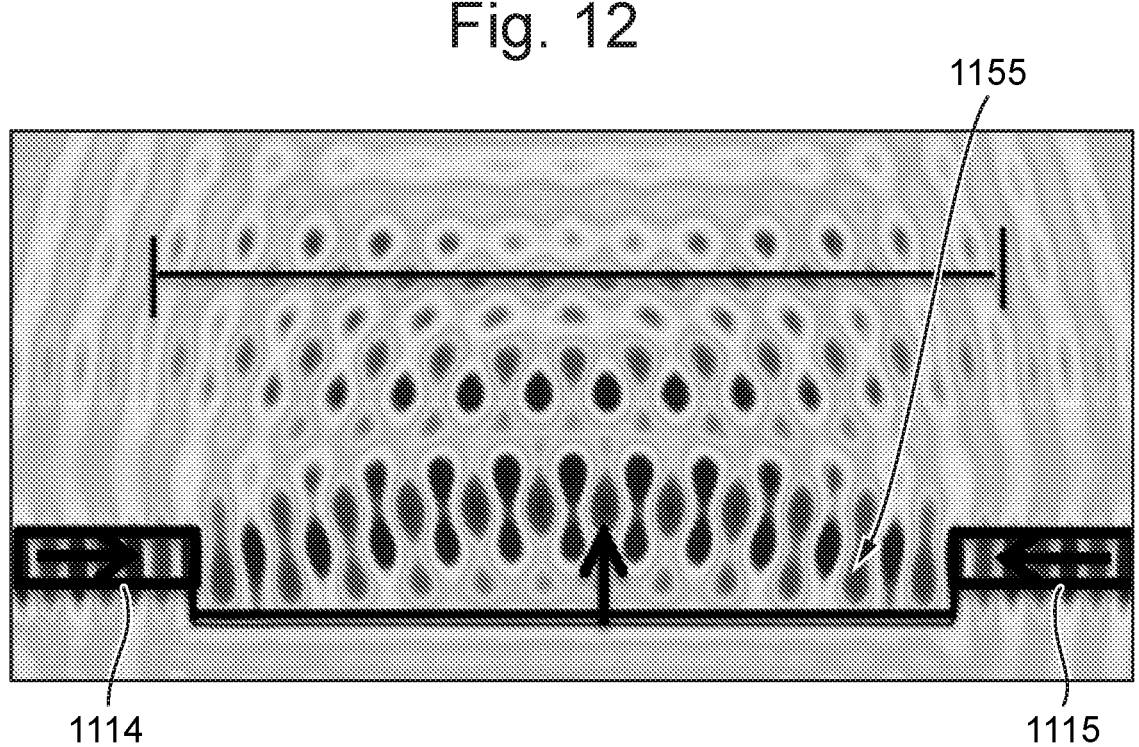
FIG. 12 is a side view of a periodic interference pattern generated in the sample region of the optical component of FIG. 11.

FIG. 12 illustrates a simulation of the 3D periodic light pattern that is generated as a result of (i) directing input light from a grating 1121 in the sample region 1155 in an orthogonal direction relative to the plane of the sample region 1155, and (ii) directing (e.g. with any of the aforementioned opposing waveguide) input light into the sample region 1155 along opposing and parallel directions 1114a, 1115a in the plane of the waveguides 1114, 1115.

As an example, the following steps may be taken to obtain a 3D SIM image of a sample. First, input light 1122 may be directed upwardly from the grating 1121 into the sample region 1155, so as to interfere with the first periodic light pattern 800b of FIG. 8. Next, the input light 1122 from the grating 1121 may be interfered with the second periodic light pattern 800c of FIG. 8. Subsequently, the input light 1122 from the grating 1121 may be interfered with the third periodic light pattern 800a of FIG. 8.

Optionally, the fringes of the first, second, and third periodic light patterns may be shifted using a phase adjustor, as per the previous embodiments.

The light emitted from the sample in response to the different illuminating periodic light patterns (i.e. the different illumination patterns associated with the different orientations and fringe displacements) may be collected and processed using known SIM processing methods to generate a 3D SIM image of the sample.

FIG. 13 shows an apparatus 1300 for performing fluorescence microscopy, which includes an objective lens 1330, such as a Plan N 20x10.4 Olympus™ objective lens, having a forward field of view 1332 that faces a sample region 1355 of an optical component 1310. It also includes a light-injecting device 1340 optically coupled to an input interface 1311 of the optical component 1310. A sample 1350 is positioned in the sample region 1355. The apparatus 1300 also includes an imaging unit 1360 configured to receive and process the light collected by the objective lens 1330 within the forward field of view 1332. The imaging unit 1360 may comprise the same component as the imaging unit 60 of FIG. 1.

The light-injecting device 40 comprises a lens 1346 and a light source 1342 which, in this example, is a visible wavelength laser source. Light from the light source is split into two beams by an external splitter 1333 (e.g. an optical fibre multiplexer splitter). One of the output beams of the splitter 1333 is directed to a first lens 1346a by a first optical fibre 1344a. The other output beam of the splitter 1333 is directed to a second lens 1346b by a second optical fibre 1344b. The first lens 1346a is arranged to focus the light from the first optical fibre 1344a into the input interface 1311 of the optical component 1310. The optical component 1310 may form a first input beam and a second input beam with the received light, and direct these beams into the sample region (e.g. via 2D waveguides) in accordance with any of the methods and arrangements disclosed herein.

The second lens 1346b is arranged to focus light from the second optical fibre 1344b onto a mirror 1347. The mirror 1347 directs received light to the objective lens 1330. The objective lens 1330 focuses the light from the mirror 1347 into the sample region 1355 as third input light 1348 at a 90 degree angle relative to the plane of the sample region 1355. However, in some embodiments, the objective lens 1330 may be arranged to direct the third input light into the sample region 1355 at any angle relative to the plane of the sample region 1355. Preferably, the field of view of the objective lens 1330 faces the sample region 1355, and the objective lens 1330 is arranged to collect light from the sample 1350 within the sample region 1355.

To generate 3D images, the apparatus of FIG. 13 may be used to direct input light into the sample region using the objective lens 1330 so as to interfere with a first periodic light pattern generated by the optical component 1310. For example, the first periodic light pattern may be the periodic light pattern 800b of FIG. 8b. the third input light from the objective lens 1330 may subsequently be interfered with other periodic light patterns generated by the optical component 1310 (e.g. the third input light may be interfered with the periodic light pattern 800c of FIG. 8c, and subsequently with the periodic light pattern 800a of FIG. 8a).

Optionally, the fringes of the first, second, and third periodic light patterns may be displaced using a phase adjustor, as per the previous embodiments.

The light emitted from the sample in response to the different illuminating periodic light patterns (i.e. the different illumination patterns associated with the different orientations and fringe displacements) may be collected and processed using known SIM processing methods to generate a 3D SIM image of the sample.

In arrangements where excitation light directed onto the sample emanates from an edge facet of the waveguide, the upper cladding layer of the waveguide may be air. That is, the layers of the waveguide may comprise a lower cladding region arranged on the substrate of the optical component and a core region 203 arranged on the lower cladding region.

In alternative embodiments wherein air is used as the upper cladding layer of the waveguide(s) it will be appreciated that the sample may be placed directly onto the waveguide to interact with the evanescent field of the guided light within the waveguide. Accordingly, in this arrangement a sample well is not needed and the sample may be illuminated with an interference pattern by placing it directly onto the waveguide and guiding two counter propagating beams within the waveguide.

In the above embodiments, the optical splitters are a y-branch waveguide splitter, although it will be appreciated that they may alternatively be any other type of optical splitter such as a multimode interference coupler (MMI) or an evanescent waveguide coupler.

It will be appreciated by those skilled in the art that the invention has been illustrated by describing several specific embodiments thereof, but is not limited to these embodiments; many variations and modifications are possible, within the scope of the accompanying claims.

The invention claimed is:

1. An optical component for illuminating a sample region with a periodic light pattern, the optical component comprising a first waveguide, a further waveguide, and an optical splitter, the optical splitter having (i) an input for receiving input light, (ii) a first output, and (iii) a second output, wherein:
   the first output of the optical splitter is optically coupled to the first waveguide so as to direct first input light into the first waveguide;
   the first waveguide is arranged to use total internal reflection to direct the first input light into the sample region along a first path in a first direction;
   the second output of the optical splitter is optically coupled to the sample region so as to direct second input light into the sample region along a second path in a second direction;
   the further waveguide is arranged to receive third input light and to use total internal reflection to direct the third input light into the sample region along a third path in a third direction;
   the second direction is different from the first direction so that, in use, the first input light interferes with the second input light to form a periodic light pattern in the sample region;
   the third direction is different from the first direction and from the second direction; and
   the first, second and third directions are coplanar.

2. The optical component of claim 1, further comprising a second waveguide, wherein the second output of the optical splitter is optically coupled to the second waveguide, the second waveguide being arranged to use total internal reflection to direct the second input light into the sample region along the second direction.

3. The optical component of claim 1, wherein the optical splitter is a y-branch splitter, an evanescent waveguide coupler, or a multimode interference component.

4. The optical component of claim 1, wherein the optical component is a photonic integrated component.

5. The optical component of claim 1, wherein the first direction is parallel and opposite to the second direction.

6. The optical component of claim 1, wherein at least one of said waveguides is arranged to guide the received light towards the sample region along a respective optical path, wherein said optical path has a width that increases in a direction towards the sample region.

7. The optical component of claim 1, wherein at least one of said waveguides comprises an end facet arranged to direct light into the sample region.

8. The optical component of claim 1, wherein at least one of said waveguides is arranged to direct, into the sample region, only an evanescent field component of light received by the waveguide.

9. The optical component of claim 1, wherein the optical component defines a sample well for holding a sample.

10. The optical component of claim 9, comprising a core layer and an optical cladding layer, wherein the sample well is defined at least partly by the optical cladding layer and the core layer.

11. The optical component of claim 1, further comprising a phase adjuster, wherein one of said waveguides is coupled to the phase adjuster, the phase adjuster being arranged to adjust the phase of input light before the input light is directed into the sample region.

12. The optical component of claim 1, further comprising an input formed on a single face of the optical component and arranged to receive the first, second and third input lights.

13. The optical component of claim 12, wherein the input comprises a single socket for coupling with one or more fiber optic cables.

14. The optical component of claim 1, wherein the first, second and third paths lie in a common plane.

15. The optical component of claim 1, further comprising a fourth waveguide, wherein the fourth waveguide is arranged to receive fourth input light and to use total internal reflection to direct the fourth input light into the sample region along a fourth path in a fourth direction, wherein the fourth direction is different from the first, the second, and the third directions and is coplanar with the first, second and third directions.

16. The optical component of claim 1, further comprising an optical grating and a fourth waveguide, wherein the fourth waveguide is arranged to receive fourth input light and to use total internal reflection to direct the fourth input light onto the optical grating and the optical grating is arranged to direct the received fourth input light into the sample region along a fourth path in a fourth direction, wherein the fourth direction is different from the first, the second, and the third directions and is not coplanar with the first, second and third directions.

17. A method for illuminating a sample region of an optical component, the method comprising:
   providing an optical component comprising a first waveguide, a further waveguide, and an optical splitter;
   receiving input light at the optical splitter;
   receiving first input light in the first waveguide from a first output of the optical splitter;
   using total internal reflection within the first waveguide to direct the first input light into the sample region along a first path in a first direction;
   directing, from a second output of the optical splitter, second input light into the sample region along a second path in a second direction, wherein the second direction is different from the first direction;
   receiving third input light in the further waveguide;
   using total internal reflection within the further waveguide to direct the third input light into the sample region along a third path in a third direction, wherein the third direction is different from the first and the second directions, and the first, second and third directions are coplanar; and
   interfering the first input light and the second input light, or the first, second and the third input light, together to form a periodic light pattern in the sample region.

18. The method of claim 17, further comprising:
   receiving fourth input light in a fourth waveguide of the optical component;
   using total internal reflection within the fourth waveguide to direct the fourth input light into the sample region along a fourth path in a fourth direction, wherein the fourth direction is different from the first, the second, and the third directions;

interfering the first input light with the second input light to form a first periodic light pattern in the sample region; and interfering the third input light with the fourth input light to form a second periodic light pattern in the sample region.

19. The method of claim 17, further comprising:

collecting light emanating from the sample region; and performing structured illumination microscopy with the collected light.

20. A system for imaging a sample using structured illumination microscopy, the system comprising:

a light-injecting apparatus;

an optical component comprising a first waveguide, a further waveguide and an optical splitter, the optical splitter having (i) an input for receiving input light, (ii) a first output, and (iii) a second output, wherein:

the first output of the optical splitter is optically coupled to the first waveguide so as to direct first input light into the waveguide;

the first waveguide is arranged to use total internal reflection to direct the first input light into the sample region along a first path in a first direction;

the second output of the optical splitter is optically coupled to the sample region so as to direct second input light into the sample region along a second path in a second direction;

the further waveguide is arranged to receive third input light and to use total internal reflection to direct the third input into the sample region along a third path in a third direction;

the second direction is different from the first direction so that, in use, the first input light interferes with the second input light to form a periodic light pattern in the sample region;

the third direction is different from the first direction and from the second direction; and the first, second and third directions are coplanar;

an objective lens arranged to collect light emanating from the sample region; and an imaging unit arranged to perform structured illumination microscopy with the collected light.

\* \* \* \* \*